US011953927B2

(12) United States Patent
Yuh et al.

(10) Patent No.: US 11,953,927 B2
(45) Date of Patent: Apr. 9, 2024

(54) BIAS GENERATING DEVICES AND METHODS FOR GENERATING BIAS

(71) Applicant: TAIWAN SEMICONDUCTOR MANUFACTURING COMPANY LTD., Hsinchu (TW)

(72) Inventors: Perng-Fei Yuh, Walnut Creek, CA (US); Yoshitaka Yamauchi, Hsinchu (TW); Yih Wang, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 175 days.

(21) Appl. No.: 17/238,064

(22) Filed: Apr. 22, 2021

(65) Prior Publication Data

US 2022/0342436 A1 Oct. 27, 2022

(51) Int. Cl.
*G05F 3/26* (2006.01)
*G05F 3/24* (2006.01)

(52) U.S. Cl.
CPC ................ *G05F 3/262* (2013.01); *G05F 3/24* (2013.01)

(58) Field of Classification Search
CPC ..... G05F 3/02; G05F 3/08; G05F 3/10; G05F 3/16; G05F 3/185; G05F 3/205; G05F 3/24; G05F 3/262; G05F 1/10; G05F 1/46; G05F 1/56; G05F 3/26; G05F 3/267; H02M 3/156; H02M 3/158
See application file for complete search history.

(56) References Cited

U.S. PATENT DOCUMENTS

| | | | | |
|---|---|---|---|---|
| 4,663,584 A * | 5/1987 | Okada | H03H 11/245 323/315 |
| 4,847,518 A * | 7/1989 | Leidich | G01R 1/20 327/543 |
| 6,184,745 B1 * | 2/2001 | Kim | G05F 3/242 327/543 |
| 6,384,671 B1 * | 5/2002 | Taguchi | H03K 17/16 327/541 |
| 2016/0049928 A1 * | 2/2016 | Kim | H03K 17/162 327/537 |
| 2017/0293314 A1 * | 10/2017 | Song | G05F 3/262 |
| 2018/0335795 A1 * | 11/2018 | Huang | G05F 3/205 |
| 2019/0371398 A1 * | 12/2019 | Chou | G11C 13/0028 |

OTHER PUBLICATIONS

K. Itoh, "VLSI Memory Chip Design. Springer," pp. 332-333, 5.5 The Half-VDD Generator, 2001.

* cited by examiner

*Primary Examiner* — Thienvu V Tran
*Assistant Examiner* — Shahzeb K Ahmad
(74) *Attorney, Agent, or Firm* — WPAT Law; Anthony King

(57) ABSTRACT

The present disclosure provides a bias generating device and a method for generating bias. A bias generating device includes a first diode-connected transistor pair connected to receive a first voltage; a second diode-connected transistor pair connected to receive a second voltage; and a first transistor pair connected to the first diode-connected transistor pair and the second diode-connected transistor pair. The first transistor pair is configured to generate a third voltage in response to the first voltage and the second voltage.

20 Claims, 18 Drawing Sheets

100C

100B

BIAS GENERATING DEVICES AND METHODS FOR GENERATING BIAS

BACKGROUND

An electronic device, e.g., a chip or computer, may include various components for various functions. For example, an electronic device may include an eFuse, one-time programmable memory, a dynamic random-access memory (DRAM), core-only high voltage circuits, or a processor. Different components in an electronic device may work with different bias voltages.

BRIEF DESCRIPTION OF THE DRAWINGS

Aspects of the present disclosure are best understood from the following detailed description when read with the accompanying figures. It is noted that in accordance with the standard practice in the industry, various features are not drawn to scale. In fact, the dimensions of the various features may be arbitrarily increased or reduced for clarity of discussion.

DETAILED DESCRIPTION

Figure 1B:
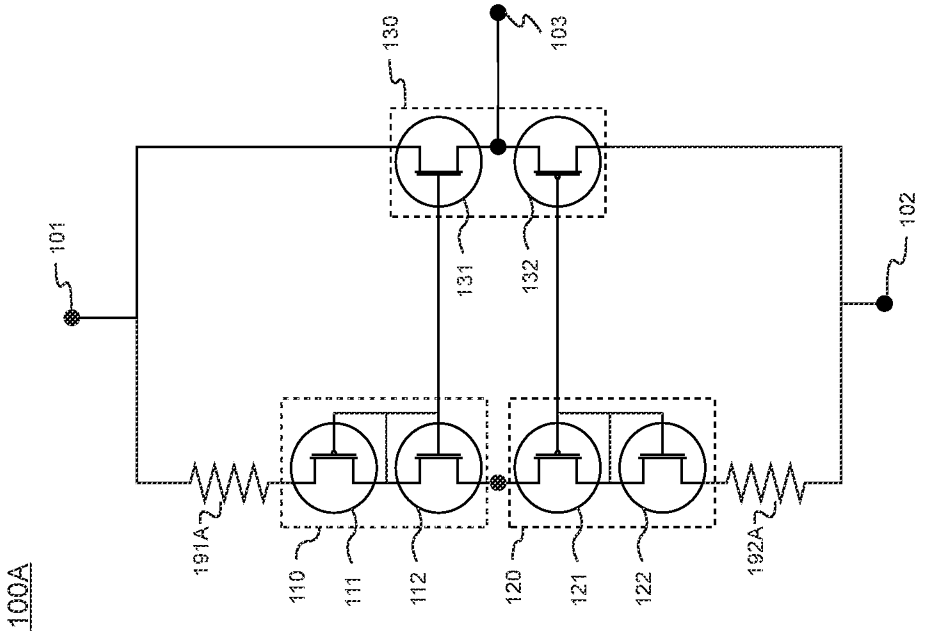
FIG. 1B is a schematic diagram of a bias voltage generating device in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The nature and use of the embodiments are discussed in detail as follows. It should be appreciated, however, that the present disclosure provides many applicable inventive concepts that can be embodied in a wide variety of specific contexts. The specific embodiments discussed are merely illustrative of specific ways to embody and use the disclosure, without limiting the scope thereof.

Figure 1A:
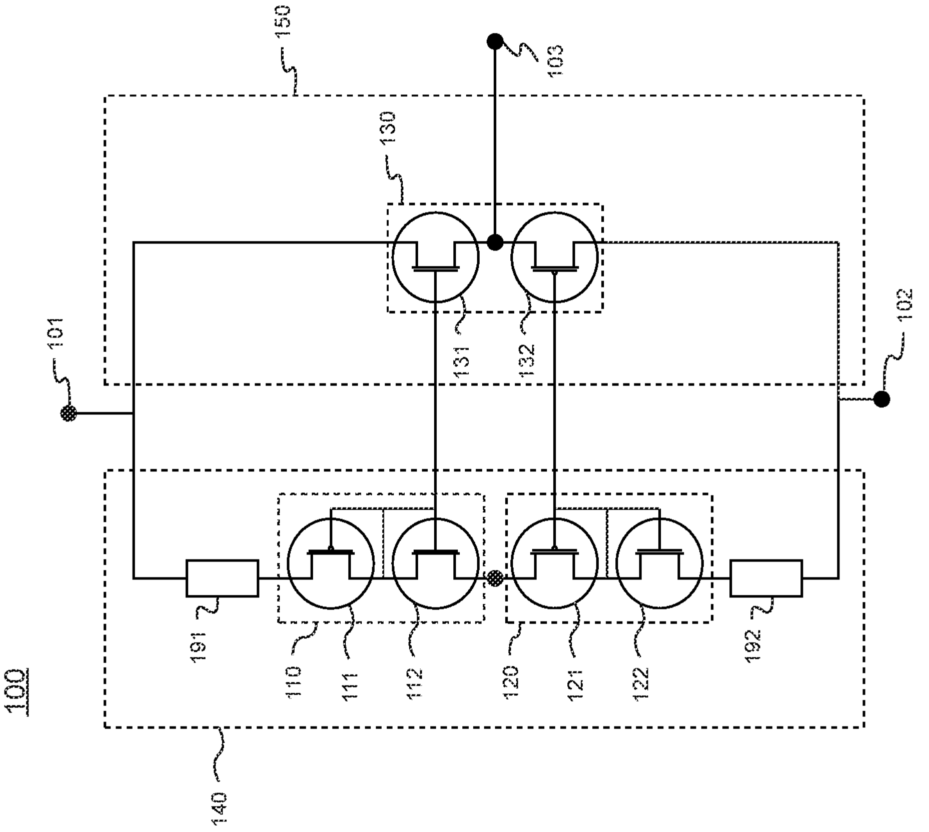
FIG. 1A is a schematic diagram of a bias voltage generating device in accordance with some embodiments of the present disclosure.

FIG. 1A is a schematic diagram of a bias voltage generating device 100 in accordance with some embodiments of the present disclosure. FIG. 1A discloses an exemplary circuit of the bias voltage generating device 100. The bias voltage generating device 100 may include three terminals 101, 102, and 103. The terminal 103 may be an output voltage terminal to output a bias voltage. The terminal 103 may be a voltage terminal to provide a bias voltage to drive an electronic device. A supply voltage (e.g., VDD) may be provided at the terminal 101. A common voltage (e.g., VSS or GND) may be provided at the terminal 102.

The bias voltage generating device 100 may include transistor pairs 110 and 120. The transistor pairs 110 and 120 may be or include diode connected transistor pairs. The transistor pair 110 may include a p-type transistor 111 and a n-type transistor 112. In some embodiments, each of the p-type transistor 111 and the n-type transistor 112 may be a diode-connected transistor. For example, the p-type transistor 111 may be a p-type MOSFET, and the drain and the gate of the p-type transistor 111 may be connected to each other.

For example, the n-type transistor 112 may be a n-type MOSFET, and the drain and the gate of the n-type transistor 112 may be connected to each other. In the transistor pair 110, the drain and the gate of the p-type transistor 111 is connected to the drain and the gate of the n-type transistor 112.

The transistor pair 120 may include a p-type transistor 121 and a n-type transistor 122. Each of the p-type transistor 121 and the n-type transistor 122 may be a diode-connected transistor. For example, the p-type transistor 121 may be a p-type MOSFET, and the drain and the gate of the p-type transistor 121 may be connected to each other. For example, the n-type transistor 122 may be a n-type MOSFET, and the drain and the gate of the n-type transistor 122 may be connected to each other. In the transistor pair 120, the drain and the gate of the p-type transistor 121 is connected to the drain and the gate of the n-type transistor 122.

The transistor pairs 110 and 120 are connected to each other. For example, the source of the n-type transistor 112 may be connected to the source of the p-type transistor 121.

The bias voltage generating device 100 may include impedance elements 191 and 192. In some embodiments, the impedance elements 191 and 192 may include resistors, transistors, diodes, or any other elements that can provide impedance for the bias voltage generating device 100. The impedance element 191 may be connected between the terminal 101 and the transistor pair 110. The impedance element 191 may be connected between the terminal 101 and the p-type transistor 111. The impedance element 192 may be connected to the transistor pair 120 and the terminal 102. The impedance element 192 may be connected between the n-type transistor 122 and the terminal 102.

The bias voltage generating device 100 may include a transistor pair 130. The transistor pair 130 may be connected to the terminals 101, 102, and 103. The transistor pair 130 may include a n-type transistor 131 and a p-type transistor 132. For example, the n-type transistor 131 may be a n-type MOSFET, and the p-type transistor 132 may be a p-type MOSFET. The drain of the n-type transistor 131 may be connected to the terminal 101. The drain of the p-type transistor 132 may be connected to the terminal 102. The source of the n-type transistor 131 may be connected to the source of the p-type transistor 132. The source of the n-type transistor 131 and the source of the p-type transistor 132 are connected to the terminal 103. The gate of the n-type transistor 131 may be connected to the transistor pair 110. The gate of the n-type transistor 131 may be connected to the gate of the n-type transistor 112. The gate of the p-type transistor 132 may be connected to the transistor pair 120. The gate of the p-type transistor 132 may be connected to the gate of the p-type transistor 121.

In some embodiments, the transistor pairs 110 and 120 and impedance elements 191 and 192 may function as a reference bias section 140 for the bias voltage generating device 100. In some embodiments, the transistor pair 130 may function as a driving section 150 (or an output stage) of the bias voltage generating device 100.

In some embodiments, VDD is provided at the terminal 101, and GND is provided at the terminal 102. The output voltage at the terminal 103 may be expressed as $V_O=½VDD+½[(V_{TP1}+V_{TN1})-(V_{TP2}+V_{TN2})]$, where $V_{TP1}$ represents the threshold voltage of the p-type transistor 111, $V_{TN1}$ represents the threshold voltage of the n-type transistor 112, $V_{TP2}$ represents the threshold voltage of the p-type transistor 121, and $V_{TN2}$ represents the threshold voltage of the n-type transistor 122. A threshold voltage of a transistor (e.g., $V_{TP1}$, $V_{TN1}$, $V_{TP2}$, and $V_{TN2}$)) may be temperature dependent, which would adversely affect the accuracy of the output voltage at the terminal 103. When the p-type transistors 111, 121 and the n-type transistors 112, 122 are selected so that $V_{TP1}+V_{TN1}$ is equal to $V_{TP2}+V_{TN2}$, the output voltage at the terminal 103 may be expressed as $V_O=½VDD$. Since the variation of the threshold voltage of the transistors (e.g., the p-type transistors 111, 121 and the n-type transistors 112, 122) is eliminated or mitigated, the output voltage of the bias voltage generating device 100 would be more accurate and stable.

In some embodiments, a ratio of the current flowing through the reference bias section 140 to that flowing through the driving section 150 may be 1:1. In some embodiments, the ratio of the current flowing through the reference bias section 140 to that flowing through the driving section 150 may be 1:X depending on an aspect ratio of the n-type transistor 112 to the n-type transistor 131 (and the p-type transistor 121 to the p-type transistor 132).

FIG. 1B is a schematic diagram of a bias voltage generating device 100A in accordance with some embodiments of the present disclosure. Compared with the bias voltage generating device 100 in FIG. 1A, resistors 191A and 192A are used in the bias voltage generating device 100A. The bias voltage generating device 100A may include the resistors 191A and 192A. The resistor 191A may be connected between the terminal 101 and the transistor pair 110. The resistor 191A may be connected between the terminal 101 and the transistor pair 110. The resistor 192A may be connected between the transistor pair 120 and the terminal 102. The resistor 192A may be connected between the transistor pair 120 and the terminal 102.

Figure 1D:
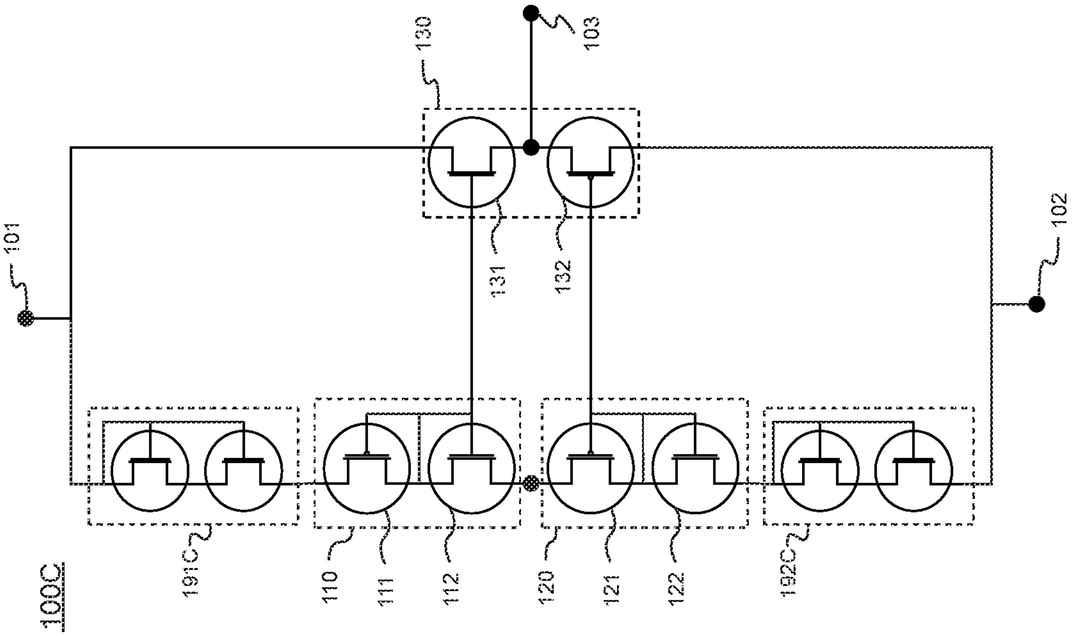
FIG. 1D is a schematic diagram of a bias voltage generating device in accordance with some embodiments of the present disclosure.
Figure 1C:
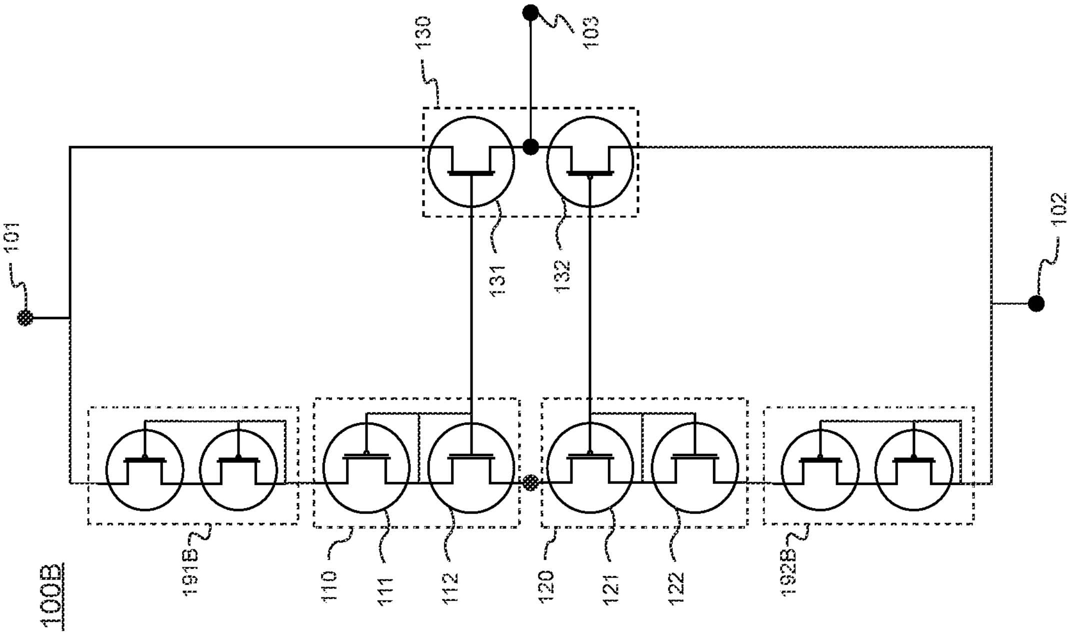
FIG. 1C is a schematic diagram of a bias voltage generating device in accordance with some embodiments of the present disclosure.

FIG. 1C is a schematic diagram of a bias voltage generating device 100E in accordance with some embodiments of the present disclosure. Compared with the device 100 in FIG. 1A, long channel MOS diodes 191B and 192B are used in the bias voltage generating device 100B. The bias voltage generating device 1003 may include the long channel MOS diodes 191B and 1923. The long channel MOS diodes 191B and 192B may include two or more p-type MOSFETs, for example two or more diode-connected p-type MOSFETs. The long channel MOS diode 191B may be connected between the terminal 101 and the transistor pair 110. The long channel MOS diode 1913 may be connected between the terminal 101 and the diode-connected transistor pair 110. The long channel MOS diode 1923 may be connected between the transistor pair 120 and the terminal 102. The long channel MOS diode 192B may be connected between the transistor pair 120 and the terminal 102, FIG. 1D is a schematic diagram of a bias voltage generating device 100C in accordance with some embodiments of the present disclosure. Compared with the bias voltage generating device 100 in FIG. 1A, long channel MOS diodes 1910 and 192C are used in the bias voltage generating device 100C. The bias voltage generating device 1000 may include the long channel MOS diodes 191C and 192C. The long channel MOS diodes 191C and 192C may include two or more n-type MOSFETs, for example two or more diode-connected n-type MOSFETs. The long channel MOS diode 191C may be connected between the terminal 101 and the transistor pair 110. The long channel MOS diode 191C may be connected between the terminal 101 and the transistor pair 110. The long channel MOS diode 192C may be connected between the transistor pair 120 and the terminal 102. The long channel MOS diode 1920 may be connected between the transistor pair 120 and the terminal 102. Compared with the long channel MOS diode made of p-type MOSFETs, because n-type MOSFETs have good mobility, the long channel MOS diode made of n-type MOSFETs may use more n-type MOSFETs to achieve the same effect.

Figure 1E:
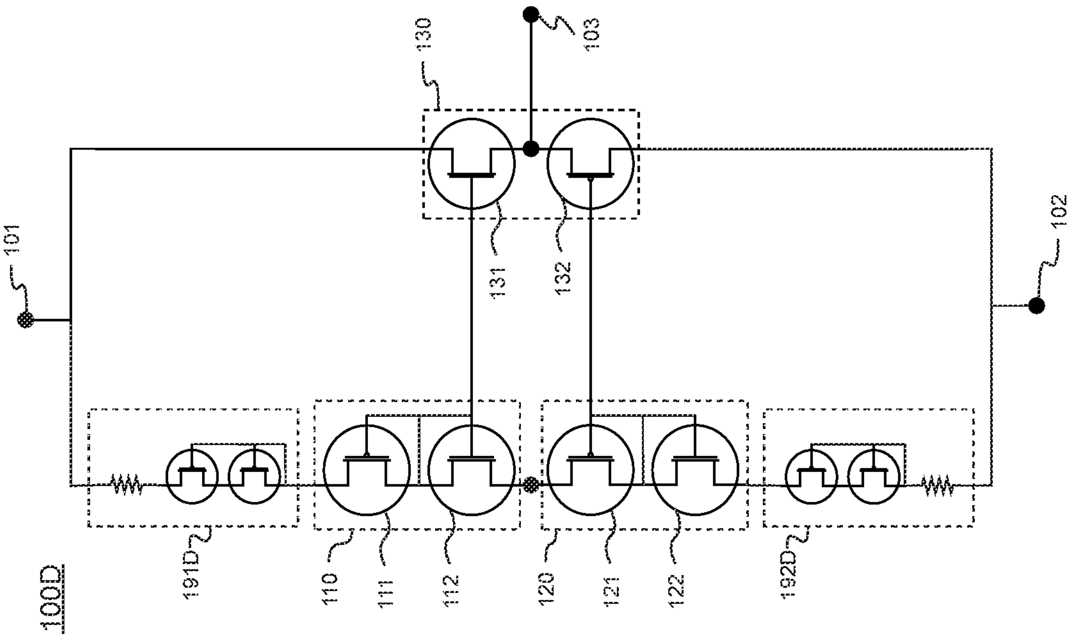
FIG. 1F is a schematic diagram of a bias voltage generating device in accordance with some embodiments of the present disclosure.

FIG. 1E is a schematic diagram of a bias voltage generating device 100D in accordance with some embodiments of the present disclosure. Compared with the bias voltage generating device 100 in FIG. 1A, the impedance elements 191D and 192D may comprise a resistor and a long channel MOS diode. In FIG. 1E, the long channel MOS diode of the impedance elements 191D and 192D may made of p-type MOSFETs. The long channel MOS diode of the impedance elements 191D and 192D may comprise n-type MOSFETs. The sequence of the resistor and the long channel MOS diode in the impedance elements 191D or 192D may be reversed.

In FIG. 1E, the bias voltage generating device 100D may include the impedance elements 1911) and 192D. The impedance elements 191D and 192D may include two or more n-type MOSFETs, for example two or more diode-connected n-type MOSFETs. The impedance element 191D may be connected between the terminal 101 and the transistor pair 110. The impedance element 191D may be connected between the terminal 101 and the transistor pair 110. The impedance element 192D may be connected between the transistor pair 120 and the terminal 102. The impedance element 192D may be connected between the transistor pair 120 and the terminal 102. The impedance elements 191D and 192D including a resistor and a long channel MOS diode may prevent low threshold voltage of the transistors of the long channel MOS diode due to low temperature.

When VDD provided at the terminal 101 of the bias voltage generating device 100 is 1.8V and the GND is provided at the terminal 102 of the bias voltage generating device 100, the output voltage at the terminal 103 may be 0.9V. In simulation, the output voltage at the terminal 103 may be from 0.896V to 0.9V. In some simulations, the output voltage at the terminal 103 may be 0.896V, 0.897V, 0.898V, or 0.899V. The error rate (e.g., variation) of the output voltage at the terminal 103 of the bias voltage generating device 100 may be from 0 to 0.4%. In some simulations, the error rate (e.g., variation) of the output voltage at the terminal 103 of the bias voltage generating device 100 may be 0.1%, 0.2%, 0.3%, or 0.4%.

For conventional devices for generating bias voltage of ½VDD, when VDD is 1.8V, the output voltage may be from 0.878V to 0.902V. In some simulations, the output voltage of the conventional devices may be 0.879V, 0.88V, 0.886V, 0.888V, 0.89V, 0.893V, 0.9V, or 0.902V. The error rate (e.g., variation) of the output voltage of the conventional devices may be from 0 to 2.3%. In some simulations, the error rate (e.g., variation) of the output voltage at the terminal 103 of the device 100 may be 0.1%, 0.2%, 0.8%, 1%, 1.3%, 1.5%, or 2.3%.

Figure 2:
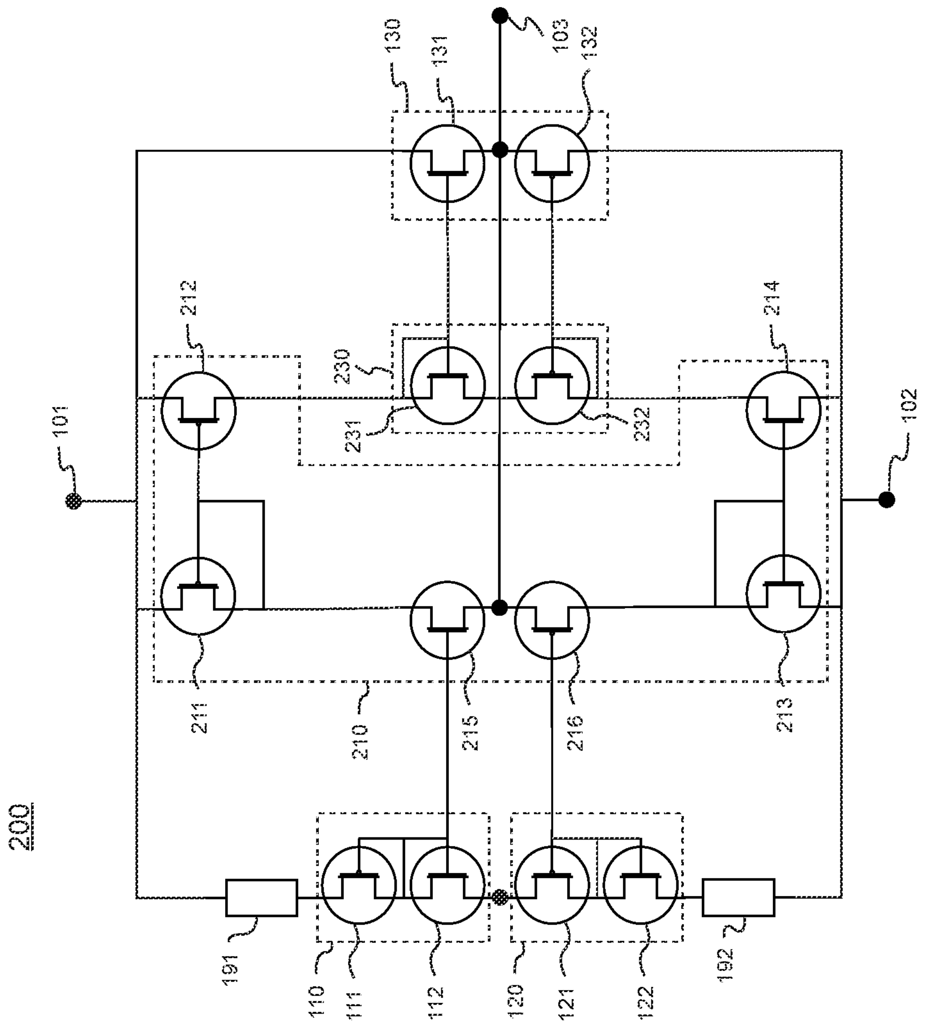
FIG. 2 is a schematic diagram of a bias voltage generating device in accordance with some embodiments of the present disclosure.

FIG. 2 is a schematic diagram of a bias voltage generating device 200 in accordance with some embodiments of the present disclosure. Compared with the bias voltage generating device 100 in FIG. 1A, the bias voltage generating device 200 may further include a sense section 210 and a gain section 230. Compared with the device 100 in FIG. 1A, the device 200 may further include a push-pull stage and a feedback mechanism.

In FIG. 2, the bias voltage generating device 200 may include p-type transistors 211, 212, 216, and 232 (e.g., p-type MOSFETs) and n-type transistors 213, 214, 215, and 231 (e.g., n-type MOSFETs). The sense section 210 may include the p-type transistors 211, 212, and 216 (e.g., p-type MOSFETs) and the n-type transistors 213, 214, and 215 (e.g., n-type MOSFETs). The gain section 230 may include the p-type transistor 232 (e.g., a p-type MOSFET) and the n-type transistor 231 (e.g., a n-type MOSFET).

In FIG. 2, the p-type transistor 211 may be a diode-connected transistor. The gate and the drain of the p-type transistor 211 may be connected to each other. The p-type transistor 211 may be connected between the terminal 101, the p-type transistor 212, and the n-type transistor 215. The source of the p-type transistor 211 may be connected to the terminal 101. The drain of the p-type transistor 211 may be connected to the drain of the n-type transistor 215. The gate of the p-type transistor 211 may be connected to the gate of the p-type transistor 212.

In FIG. 2, the p-type transistor 212 may be connected between the terminal 101, the p-type transistor 212, and the n-type transistor 231. The source of the p-type transistor 212 may be connected to the terminal 101. The drain of the p-type transistor 212 may be connected to the drain of the n-type transistor 231. The gate of the p-type transistor 212 may be connected to the gate of the p-type transistor 211. The p-type transistors 211 and 212 may form a current mirror.

In FIG. 2, the n-type transistor 215 may be connected between the p-type transistor 211, the transistor pair 110, the terminal 103, and the p-type transistor 216. The drain of the n-type transistor 215 may be connected to the drain of the p-type transistor 211. The source of the n-type transistor 215 may be connected to the terminal 103 and the source of the p-type transistor 216. The gate of the n-type transistor 215 may be connected to the transistor pair 110 (e.g., the gate of the n-type transistor 112).

In FIG. 2, the p-type transistor 216 may be connected between the n-type transistor 215, the transistor pair 120, the terminal 103, and the n-type transistor 213. The source of the p-type transistor 216 may be connected to the terminal 103 and the source of the n-type transistor 215. The drain of the p-type transistor 216 may be connected to the drain of the n-type transistor 213. The gate of the p-type transistor 216 may be connected to the transistor pair 120 (e.g., the gate of the p-type transistor 121).

In FIG. 2, the n-type transistor 213 may be a diode-connected transistor. The gate and the drain of the n-type transistor 213 may be connected to each other. The n-type transistor 213 may be connected between the p-type transistor 216, the n-type transistor 214, and the terminal 102. The drain of the n-type transistor 213 may be connected to the drain of the p-type transistor 216. The source of the n-type transistor 213 may be connected to the terminal 102. The gate of the n-type transistor 213 may be connected to the gate of the n-type transistor 214.

In FIG. 2, the n-type transistor 214 may be connected between the p-type transistor 232, the n-type transistor 213, and the terminal 102. The drain of the n-type transistor 214 may be connected to the drain of the p-type transistor 232. The source of the n-type transistor 214 may be connected to the terminal 102. The gate of the n-type transistor 214 may be connected to the gate of the n-type transistor 213. The n-type transistors 213 and 214 may form a current mirror.

In FIG. 2, the n-type transistor 231 may be a diode-connected transistor. The gate and the drain of the n-type transistor 231 may be connected to each other. The n-type transistor 231 may be connected between the p-type transistor 212, the p-type transistor 232, and the transistor pair 130. The drain of the n-type transistor 231 may be connected to the drain of the p-type transistor 212. The source of the n-type transistor 231 may be connected to the source of the p-type transistor 232. The gate of the n-type transistor 231 may be connected to the transistor pair 130 (e.g., the gate of the n-type transistor 131). The n-type transistors 131 and 231 may form a current mirror.

In FIG. 2, the p-type transistor 232 may be a diode-connected transistor. The gate and the drain of the p-type transistor 232 may be connected to each other. The p-type transistor 232 may be connected between the n-type transistor 231, the n-type transistor 214, and the transistor pair 130. The source of the p-type transistor 232 may be connected to the source of the n-type transistor 231. The drain of the p-type transistor 232 may be connected to the drain of the n-type transistor 214. The gate of the p-type transistor 232 may be connected to the transistor pair 130 (e.g., the gate of the p-type transistor 132). The p-type transistors 132 and 232 may form a current mirror. The n-type transistor 213 and the p-type transistor 214 may be a transistor pair or a gain transistor pair.

In the bias voltage generating device 200, when the output voltage at the terminal 103 increases, a sense current may be generated between the transistors 213 and 216. The sense current may flow from the transistor 216 to the transistor 213. Because of the current mirror formed by the transistors 213 and 214, a current between the transistors 214 and 232 may be generated in response to the sense current (i.e., between the transistors 213 and 216). The current between the transistors 214 and 232 may flow from the transistor 232 to transistor 214. Because of the transistor 232 of the gain section 230 and the transistor 132 of transistor pair 130 (which may form a current mirror), current from the transistor 132 to the terminal 102 may be generated, which may cause the output voltage at the terminal 103 to be pulled down.

In the bias voltage generating device 200, when the output voltage at the terminal 103 decreases, a sense current may be generated between the transistors 211 and 215. The sense current may flow from the transistor 211 to the transistor 215. Because of the current mirror formed by transistors 211 and 212, a current between the transistors 212 and 231 may be generated in accordance with the sense current (i.e., between the transistors 211 and 215). The current between the transistors 212 and 231 may flow from the transistor 212 to transistor 231. Because of the transistor 231 of the gain section 230 and the transistor 131 of transistor pair 130 (which may form a current mirror), current from the terminal 101 to the transistor 131 may be generated, which may cause the output voltage at the terminal 103 to be pushed up.

Due to the sense section 210 and the gain section 230 in the bias voltage generating device 200, the output voltage at the terminal 103 may be more stable, and the error rate (e.g., variation) of the output voltage at the terminal 103 may be decreased.

Figure 3B:
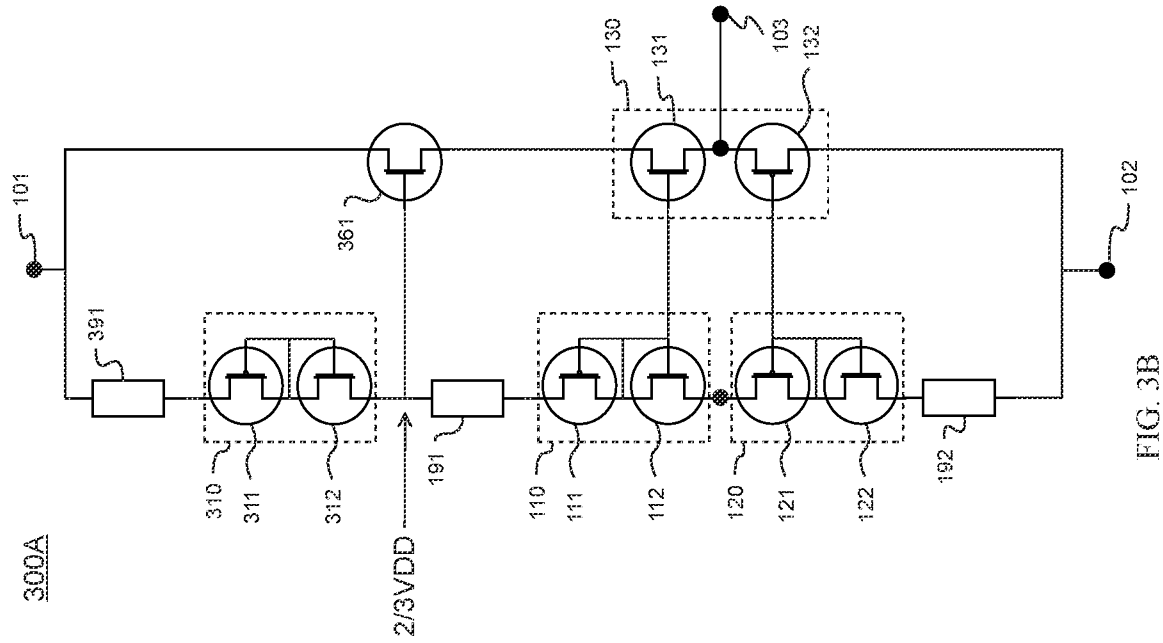
FIG. 3B is a schematic diagram of a bias voltage generating device in accordance with some embodiments of the present disclosure.
Figure 3A:
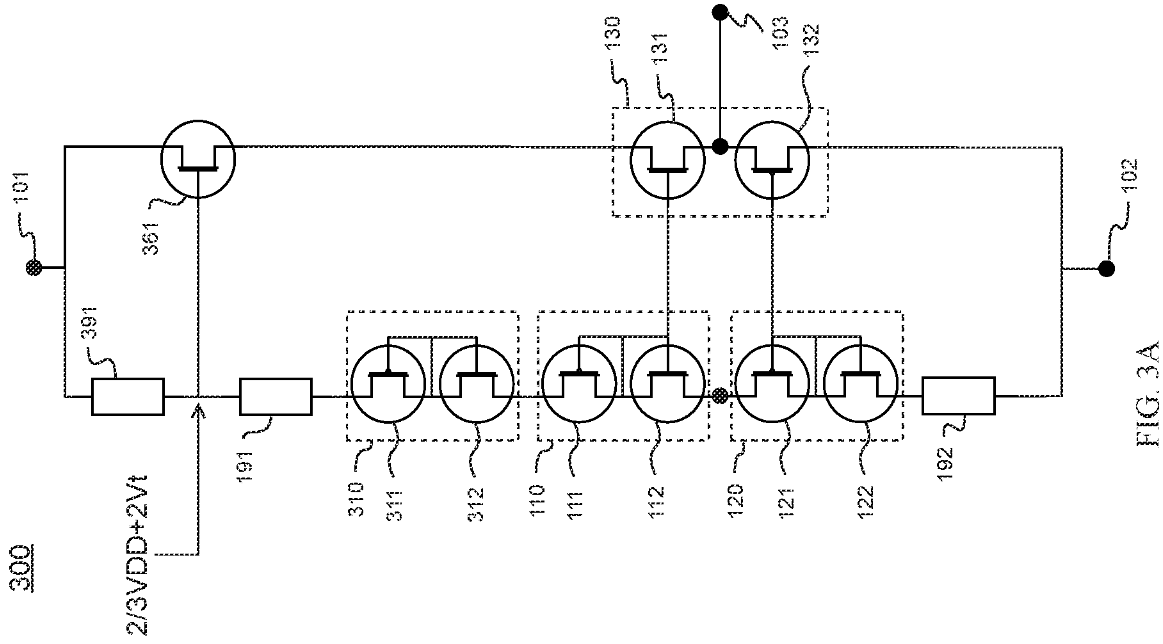
FIG. 3A is a schematic diagram of a bias voltage generating device in accordance with some embodiments of the present disclosure.

FIG. 3A is a schematic diagram of bias voltage generating device 300 in accordance with some embodiments of the present disclosure. Compared with the bias voltage generating device 100 in FIG. 1A, the bias voltage generating device 300 may further include an impedance element 391, a transistor pair 310, and a n-type transistor 361 (e.g., a n-type MOSFET). When VDD is provided at the terminal 101 and GND is provided at the terminal 102, the output voltage of ⅓VDD is provided at the terminal 103 of the bias voltage generating device 300.

In FIG. 3A, the impedance element 391 may be connected between the terminal 101, the impedance element 191, and the n-type transistor 361.

In FIG. 3A, the transistor pair 310 may be or include a diode connected transistor pair. The transistor pair 310 may be connected between the impedance element 191 and the transistor pair 110. The transistor pair 310 may include a p-type transistor 311 and a n-type transistor 312. In some embodiments, each of the p-type transistor 311 and the n-type transistor 312 may be a diode-connected transistor. For example, the p-type transistor 311 may be a p-type MOSFET, and the drain and the gate of the p-type transistor 311 may be connected to each other. For example, the n-type transistor 312 may be a n-type MOSFET, and the drain and the gate of the n-type transistor 312 may be connected to each other. In the transistor pair 310, the drain and the gate of the p-type transistor 311 is connected to the drain and the gate of the n-type transistor 312. The source of the p-type transistor 311 may be connected to the impedance element 191. The source of the n-type transistor 312 may be connected to the transistor pair 110 (e.g., the source of the p-type transistor 111).

In FIG. 3A, a reference bias section of the bias voltage generating device 300 may include the impedance elements 191, 192, and 391, and the transistor pairs 110, 120, and 310.

In FIG. 3A, the n-type transistor 361 may be connected to the terminal 101, the impedance elements 391 and 191, and the transistor pair 130. The drain of the n-type transistor 361 may be connected to the terminal 101. The source of the n-type transistor 361 may be connected to the drain of the n-type transistor 131. The gate of the n-type transistor 361 may be connected to the impedance elements 391 and 191. When VDD is provided at the terminal 101 and GND is provided at the terminal 102, the voltage applied to the gate of the n-type transistor 361 may be ⅔VDD+2Vt, where Vt may represent the threshold voltage of the transistors 311 and 312.

In FIG. 3A, a driving section of the bias voltage generating device 300 may include the n-type transistor 361 and the transistor pair 130.

In bias voltage generating device 300, the n-type transistor 361 may cause a voltage drop between the terminal 101 and the transistor pair 130 (e.g., the n-type transistor 131). Without the n-type transistor 361, the voltage between the gate and the drain of the n-type transistor 131 may be 1.2V when 1.8V is provided at the terminal 101 and GND is provided at the terminal 102. The n-type transistor 361 may protect the n-type transistor 131 from high voltage stress. In some embodiments, the bias voltage generating device 300 may not have the n-type transistor 361.

FIG. 38 is a schematic diagram of a bias voltage generating device 300A in accordance with some embodiments of the present disclosure. Compared with the bias voltage generating device 100 in FIG. 1A, the bias voltage generating device 300A may further include an impedance element 391, a transistor pair 310, and a n-type transistor 361 (e.g., a n-type MOSFET). When VDD is provided at the terminal 101 and GND is provided at the terminal 102, the output voltage of ⅓VDD is provided at terminal 103 of the bias voltage generating device 300A.

In FIG. 3B, the impedance element 391 may be connected between the terminal 101 and transistor pair 310.

In FIG. 3B, the transistor pair 310 may be or include a diode connected transistor pair. The transistor pair 310 may be connected between the impedance elements 191 and 391 and connected to the n-type transistor 361. The transistor pair 310 may include a p-type transistor 311 and a n-type transistor 312. In some embodiments, each of the p-type transistor 311 and the n-type transistor 312 may be a diode-connected transistor. For example, the p-type transistor 311 may be a p-type MOSFET, and the drain and the gate of the p-type transistor 311 may be connected. For example, the n-type transistor 312 may be a n-type MOSFET, and the drain and the gate of the n-type transistor 312 may be connected to each other. In the transistor pair 310, the drain and the gate of the p-type transistor 311 is connected to the drain and the gate of the n-type transistor 312. The source of the p-type transistor 311 may be connected to the impedance element 391. The source of the n-type transistor 312 may be connected to the impedance element 191 and the n-type transistor 361.

In FIG. 3B, a reference bias section of the bias voltage generating device 300 may include the impedance elements 191, 192, and 391, and the transistor pairs 110, 120, and 310.

In FIG. 3B, the n-type transistor 361 may be connected between the terminal 101, the impedance element 191, the transistor pair 310, and the transistor pair 130. The drain of the n-type transistor 361 may be connected to the terminal 101. The source of the n-type transistor 361 may be connected to the drain of the n-type transistor 131. The gate of the n-type transistor 361 may be connected to the impedance element 191 and the transistor pair 310 (e.g., the source of the n-type transistor 312). When VDD is provided at the terminal 101 and GND is provided at the terminal 102, the voltage applied to the gate of the n-type transistor 361 may be ⅔VDD.

In FIG. 3B, a driving section of the bias voltage generating device 300 may include the n-type transistor 361 and the transistor pair 130.

In bias voltage, generating device 300A, the n-type transistor 361 may cause a voltage drop between the terminal 101 and the transistor pair 130 (e.g., the n-type transistor 131). The n-type transistor 361 may protect the n-type transistor 131 from high voltage stress. In some embodiments, the bias voltage generating device 300A may not have the n-type transistor 361.

Figure 4:
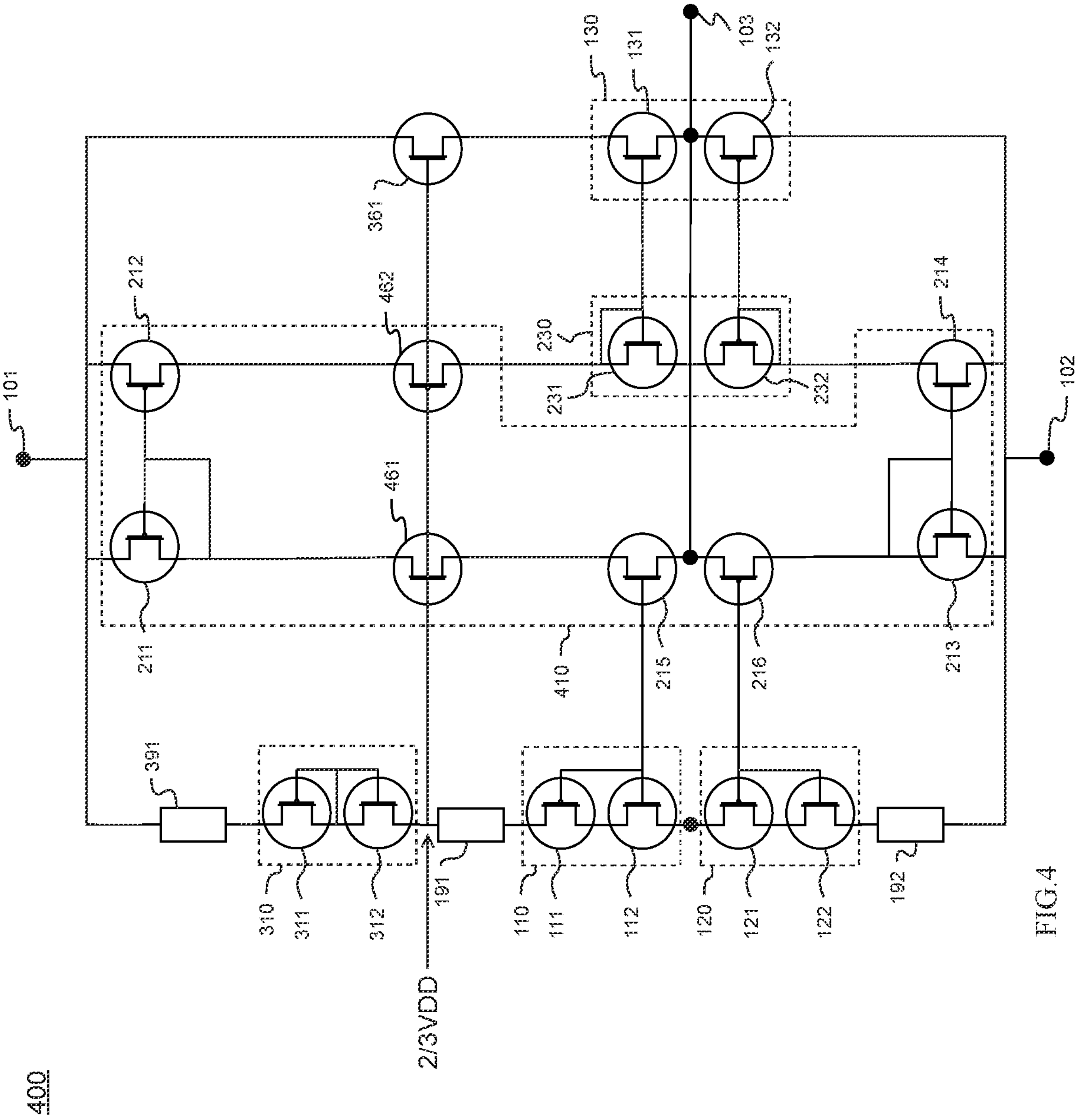
FIG. 4 is a schematic diagram of a bias voltage generating device in accordance with some embodiments of the present disclosure.

FIG. 4 is a schematic diagram of a bias voltage generating device 400 in accordance with some embodiments of the present disclosure. Compared with the bias voltage generating device 300A in FIG. 3B, the bias voltage generating device 400 may further include a sense section 410 and a gain section 230. Compared with the bias voltage generating device 300A in FIG. 3B, the bias voltage generating device 400 may include a further push-pull stage. Compared with the bias voltage generating device 300A in FIG. 3B, the bias voltage generating device 400 may include a negative feedback function.

In FIG. 4, the bias voltage generating device 400 may include p-type transistors 211, 212, 216, 232, and 462 (e.g., p-type MOSFETs) and n-type transistors 213, 214, 215, 231, 361, and 461 (e.g., n-type MOSFETs). The sense section 410 may include the p-type transistors 211, 212, 216, and 462 (e.g., p-type MOSFETs) and the n-type transistors 213, 214, 215, and 461 (e.g., n-type MOSFETs). The gain section 230 may include the p-type transistor 232 (e.g., a p-type MOSFET) and the n-type transistor 231 (e.g., a n-type MOSFET).

In FIG. 4, the p-type transistor 211 may be a diode-connected transistor. The gate and the drain of the p-type transistor 211 may be connected to each other. The p-type transistor 211 may be connected between the terminal 101, the p-type transistor 212, and the n-type transistor 461. The source of the p-type transistor 211 may be connected to the terminal 101. The drain of the p-type transistor 211 may be connected to the drain of the n-type transistor 461. The gate of the p-type transistor 211 may be connected to the gate of the p-type transistor 212.

In FIG. 4, the p-type transistor 212 may be connected between the terminal 101, the p-type transistor 212, and the p-type transistor 462. The source of the p-type transistor 212 may be connected to the terminal 101. The drain of the p-type transistor 212 may be connected to the source of the p-type transistor 462. The gate of the p-type transistor 212 may be connected to the gate of the p-type transistor 211. The p-type transistors 211 and 212 may form a current mirror.

In FIG. 4, the drain of the n-type transistor 461 may be connected to the drain of the p-type transistor 211. The source of the n-type transistor 461 may be connected to the drain of the n-type transistor 215. The gate of the n-type transistor 461 may be connected to the transistor pair 310 (e.g., the source of the n-type transistor 312), the impedance element 191, the gate of the p-type transistor 462, and the gate of the n-type transistor 361.

In FIG. 4, the source of the p-type transistor 462 may be connected to the drain of the p-type transistor 212. The drain of the p-type transistor 462 may be connected to the drain of the n-type transistor 231. The gate of the p-type transistor 462 may be connected to the transistor pair 310 (e.g., the source of the n-type transistor 312), the impedance element 191, the gate of the n-type transistor 461, and the gate of the n-type transistor 361.

In FIG. 4, the n-type transistor 215 may be connected between the n-type transistor 461, the transistor pair 110, the terminal 103, and the p-type transistor 216. The drain of the n-type transistor 215 may be connected to the source of the n-type transistor 461. The source of the n-type transistor 215 may be connected to the terminal 103 and the source of the p-type transistor 216. The gate of the n-type transistor 215 may be connected to the transistor pair 110 (e.g., the gate of the n-type transistor 112).

In FIG. 4, the p-type transistor 216 may be connected between the n-type transistor 215, the transistor pair 120, the terminal 103, and the n-type transistor 213. The source of the p-type transistor 216 may be connected to the terminal 103 and the source of the n-type transistor 215. The drain of the p-type transistor 216 may be connected to the drain of the n-type transistor 213. The gate of the p-type transistor 216 may be connected to the transistor pair 120 (e.g., the gate of the p-type transistor 121).

In FIG. 4, the n-type transistor 213 may be a diode-connected transistor. The gate and the drain of the n-type transistor 213 may be connected. The n-type transistor 213 may be connected between the p-type transistor 216, the n-type transistor 214, and the terminal 102. The drain of the n-type transistor 213 may be connected to the drain of the p-type transistor 216. The source of the n-type transistor 213 may be connected to the terminal 102. The gate of the n-type transistor 213 may be connected to the gate of the n-type transistor 214.

In FIG. 4, the n-type transistor 214 may be connected between the p-type transistor 232, the n-type transistor 213, and the terminal 102. The drain of the n-type transistor 214 may be connected to the drain of the p-type transistor 232. The source of the n-type transistor 214 may be connected to the terminal 102. The gate of the n-type transistor 214 may be connected to the gate of the n-type transistor 213. The n-type transistors 213 and 214 may form a current mirror.

In FIG. 4, the n-type transistor 231 may be a diode-connected transistor. The gate and the drain of the n-type transistor 231 may be connected. The n-type transistor 231 may be connected between the p-type transistor 462, the p-type transistor 232, and the transistor pair 130. The drain of the n-type transistor 231 may be connected to the drain of the p-type transistor 462. The source of the n-type transistor 231 may be connected to the source of the p-type transistor 232. The gate of the n-type transistor 232 may be connected to the transistor pair 130 (e.g., the gate of the n-type transistor 131). The n-type transistors 131 and 231 may form a current mirror.

In FIG. 4, the p-type transistor 232 may be a diode-connected transistor. The gate and the drain of the p-type transistor 232 may be connected. The p-type transistor 232 may be connected between the n-type transistor 231, the n-type transistor 214, and the transistor pair 130. The source of the p-type transistor 232 may be connected to the source of the n-type transistor 231. The drain of the p-type transistor 232 may be connected to the drain of the n-type transistor 214. The gate of the p-type transistor 232 may be connected to the transistor pair 130 (e.g., the gate of the p-type transistor 132). The p-type transistors 132 and 232 may form a current mirror. The n-type transistor 213 and the p-type transistor 214 may be a transistor pair or a gain transistor pair.

In bias voltage generating device 400, the n-type transistor 361 may cause a voltage drop between the terminal 101 and the transistor pair 130 (e.g., the n-type transistor 131). The n-type transistor 361 may protect the n-type transistor 131 from high voltage stress. In some embodiments, the bias voltage generating device 400 may not have the n-type transistor 361.

The n-type transistor 461 may cause a voltage drop between the transistors 211 and 215. The n-type transistor 461 may protect the n-type transistor 215 from high voltage stress. In some embodiments, the bias voltage generating device 400 may not have the n-type transistor 461.

The p-type transistor 462 may cause a voltage drop between the transistors 212 and 231. The p-type transistor 462 may protect the p-type transistor 212 from high voltage stress. In some embodiments, the bias voltage generating device 400 may not have the p-type transistor 462.

When VDD is provided at the terminal 101 and GND is provided at the terminal 102, the voltage applied to the gate of the transistor 361, the gate of the transistor 461, and the gate of the transistor 462 may be ⅔VDD.

Because of the sense section 410 and the gain section 230 in the bias voltage generating device 400, the output voltage at the terminal 103 may be more stable, and the error rate (e.g., variation) of the output voltage at the terminal 103 may be decreased.

Figure 5B:
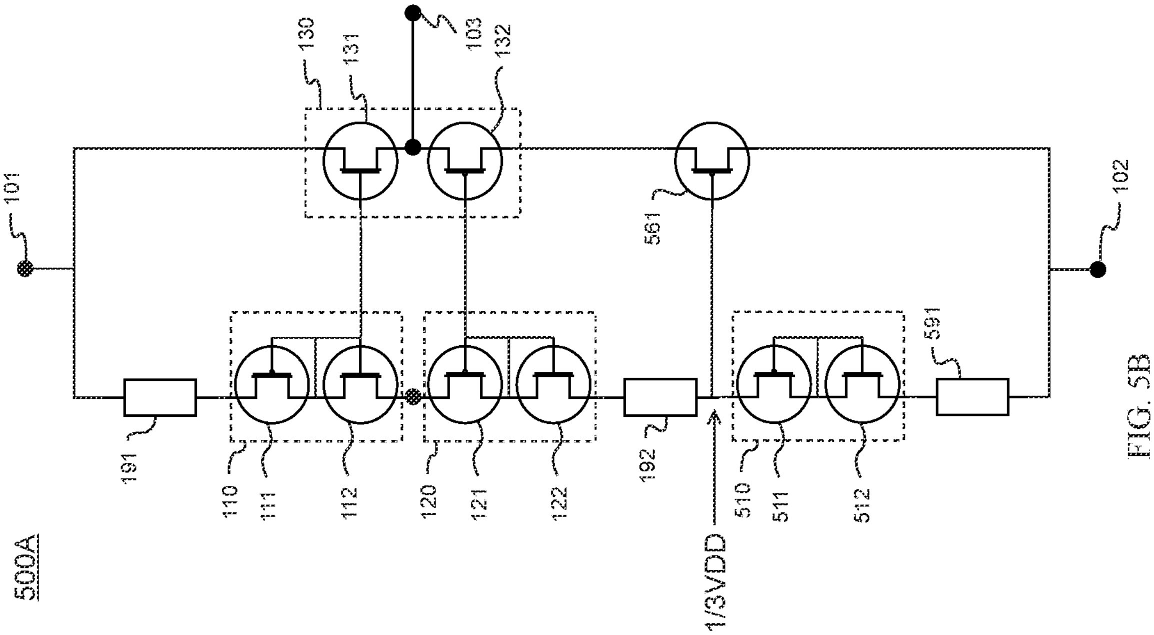
FIG. 5B is a schematic diagram of a bias voltage generating device in accordance with some embodiments of the present disclosure.
Figure 5A:
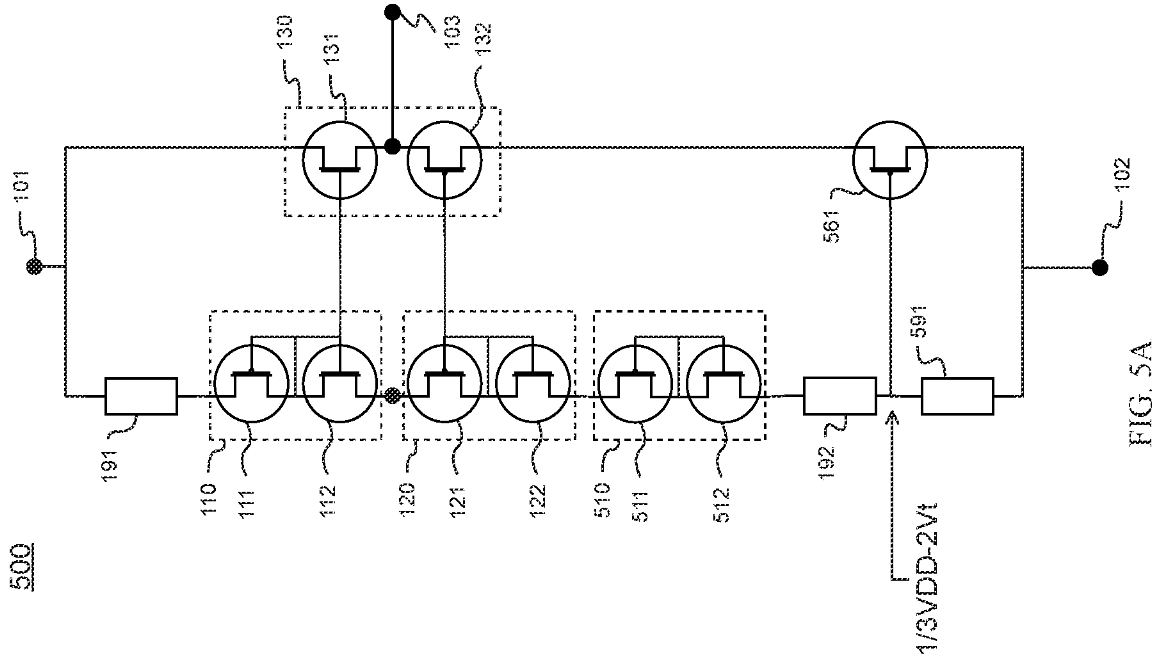
FIG. 5A is a schematic diagram of a bias voltage generating device in accordance with some embodiments of the present disclosure.

FIG. 5A is a schematic diagram of a bias voltage generating bias voltage generating device 500 in accordance with some embodiments of the present disclosure. Compared with the bias voltage generating device 100 in FIG. 1A, the bias voltage generating device 500 may further include an impedance element 591, a transistor pair 510, and a p-type transistor 561 (e.g., a p-type MOSFET). When VDD is provided at the terminal 101 and GND is provided at the terminal 102, the output voltage of VDD is provided at terminal 103 of the bias voltage generating device 300.

In FIG. 5A, the impedance element 591 may be connected between the terminal 102, the impedance element 192, and the p-type transistor 561.

In FIG. 5A, the transistor pair 510 may be or include a diode connected transistor pair. The transistor pair 510 may be connected between the impedance element 192 and the transistor pair 120. The transistor pair 510 may include a p-type transistor 511 and a n-type transistor 512. In some embodiments, each of the p-type transistor 511 and the n-type transistor 512 may be a diode-connected transistor. For example, the p-type transistor 511 may be a p-type MOSFET, and the drain and the gate of the p-type transistor 511 may be connected to each other. For example, the n-type transistor 512 may be a n-type MOSFET, and the drain and the gate of the n-type transistor 512 may be connected to each other. In the transistor pair 510, the drain and the gate of the p-type transistor 511 is connected to the drain and the gate of the n-type transistor 512. The source of the p-type transistor 511 may be connected to the transistor pair 120 (e.g., the source of the n-type transistor 122). The source of the n-type transistor 512 may be connected to the impedance element 192.

In FIG. 5A, a reference bias section of the bias voltage generating device 500 may include the impedance elements 191, 192, and 591, and the transistor pairs 110, 120, and 510.

In FIG. 5A, the p-type transistor 561 may be connected between the terminal 102, the impedance elements 591 and 191, and the transistor pair 130. The drain of the p-type transistor 561 may be connected to the terminal 102. The source of the p-type transistor 561 may be connected to the drain of the p-type transistor 132. The gate of the p-type transistor 561 may be connected to the impedance elements 591 and 191. When VDD is provided at the terminal 101 and GND is provided at the terminal 102, the voltage applied to the gate of the p-type transistor 561 may be ⅓VDD−2 Vt, where Vt represents the threshold voltage of the transistors 511 and 512.

In FIG. 5A, a driving section of the bias voltage generating device 500 may include the p-type transistor 561 and the transistor pair 130.

In bias voltage generating device 500, the p-type transistor 561 may cause a voltage drop between terminal 102 and the transistor pair 130 (e.g., the p-type transistor 132). The p-type transistor 561 may protect the p-type transistor 132 from high voltage stress. In some embodiments, the bias voltage generating device 500 may not have the p-type transistor 561.

FIG. 5B is a schematic diagram of a bias voltage generating device 500A in accordance with some embodiments of the present disclosure. Compared with the bias voltage generating device 100 in FIG. 1A, the bias voltage generating device 500A may further include an impedance element 591, a transistor pair 510, and a p-type transistor 561 (e.g., a p-type MOSFET). When VDD is provided at the terminal 101 and GND is provided at the terminal 102, the output voltage of ⅔VDD is provided at terminal 103 of the bias voltage generating device 500A.

In FIG. 5B, the impedance element 591 may be connected between the terminal 102 and the transistor pair 510.

In FIG. 5B, the transistor pair 510 may be or include a diode connected transistor pair. The transistor pair 510 may be connected between the impedance elements 191 and 591 and the p-type transistor 561. The transistor pair 510 may include a p-type transistor 511 and a n-type transistor 512. In some embodiments, each of the p-type transistor 511 and the n-type transistor 512 may be a diode-connected transistor. For example, the p-type transistor 511 may be a p-type MOSFET, and the drain and the gate of the p-type transistor 511 may be connected to each other. For example, the n-type transistor 512 may be a n-type MOSFET, and the drain and the gate of the n-type transistor 512 may be connected to each other. In the transistor pair 510, the drain and the gate of the p-type transistor 511 is connected to the drain and the gate of the n-type transistor 512. The source of the p-type transistor 511 may be connected to the impedance element 192 and the p-type transistor 561. The source of the n-type transistor 512 may be connected to the impedance element 591.

In FIG. 5B, a reference bias section of the bias voltage generating device 500A may include the impedance elements 191, 192, and 591, and the transistor pairs 110, 120, and 510.

In FIG. 5B, the p-type transistor 561 may be connected between the terminal 102, the impedance element 192, the transistor pair 510, and the transistor pair 130. The drain of the p-type transistor 561 may be connected to the terminal 102. The source of the p-type transistor 561 may be connected to the drain of the p-type transistor 132. The gate of the p-type transistor 561 may be connected to the impedance element 192 and the transistor pair 510 (e.g., the source of the p-type transistor 512). When VDD is provided at the terminal 101 and GND is provided at the terminal 102, the voltage applied to the gate of the p-type transistor 561 may be ⅓VDD.

In FIG. 5B, a driving section of the bias voltage generating device 500A may include the p-type transistor 561 and the transistor pair 130.

In bias voltage generating device 500A, the p-type transistor 561 may cause a voltage drop between the terminal 102 and the transistor pair 130 (e.g., the p-type transistor 132). The p-type transistor 561 may protect the p-type transistor 132 from high voltage stress. In some embodiments, the bias voltage generating device 500A may not have the p-type transistor 561.

Figure 6:
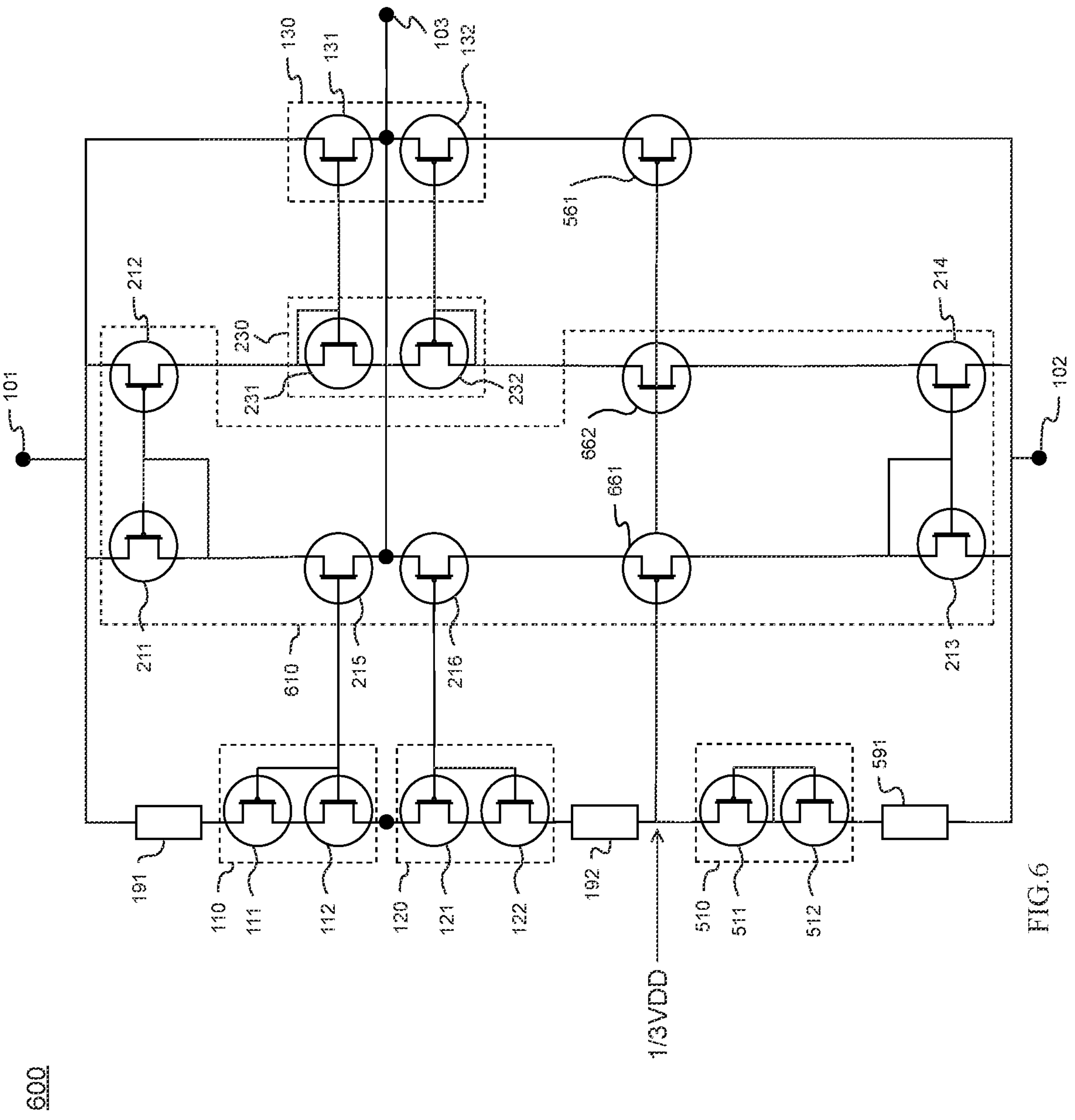
FIG. 6 is a schematic diagram of a bias voltage generating device in accordance with some embodiments of the present disclosure.

FIG. 6 is a schematic diagram of a bias voltage generating device 600 in accordance with some embodiments of the present disclosure. Compared with the bias voltage generating device 500A in FIG. 5B, the bias voltage generating device 600 may further include a sense section 610 and a gain section 230. Compared with the bias voltage generating device 500A in FIG. 5B, the bias voltage generating device 600 may include a further push-pull stage. Compared with the bias voltage generating device 5001' in FIG. 5B, the bias voltage generating device 600 may include a negative feedback function.

In FIG. 6, the bias voltage generating device 600 may include p-type transistors 211, 212, 216, 232, 561, and 661 (e.g., p-type MOSFETs) and n-type transistors 213, 214, 215, 231, and 662 (e.g., n-type MOSFETs). The sense section 610 may include the p-type transistors 211, 212, 216, and 661 (e.g., p-type MOSFETs) and the n-type transistors 213, 214, 215, and 662 (e.g., n-type MOSFETs). The gain section 230 may include the p-type transistor 232 (e.g., a p-type MOSFET) and the n-type transistor 231 (e.g., a n-type MOSFET).

In FIG. 6, the p-type transistor 211 may be a diode-connected transistor. The gate and the drain of the p-type transistor 211 may be connected. The p-type transistor 211 may be connected between the terminal 101, the p-type transistor 212, and the n-type transistor 215. The source of the p-type transistor 211 may be connected to the terminal 101. The drain of the p-type transistor 211 may be connected to the drain of the n-type transistor 215. The gate of the p-type transistor 211 may be connected to the gate of the p-type transistor 212.

In FIG. 6, the p-type transistor 212 may be connected between the terminal 101, the p-type transistor 212, and the n-type transistor 231. The source of the p-type transistor 212 may be connected to the terminal 101. The drain of the p-type transistor 212 may be connected to the drain of the n-type transistor 231. The gate of the p-type transistor 212 may be connected to the gate of the p-type transistor 211. The p-type transistors 211 and 212 may form a current mirror.

In FIG. 6, the n-type transistor 215 may be connected between the p-type transistor 211, the transistor pair 110, the terminal 103, and the p-type transistor 216. The drain of the n-type transistor 215 may be connected to the drain of the p-type transistor 211. The source of the n-type transistor 215 may be connected to the terminal 103 and the source of the p-type transistor 216. The gate of the n-type transistor 215 may be connected to the transistor pair 110 (e.g., the gate of the n-type transistor 112).

In FIG. 6, the p-type transistor 216 may be connected between the n-type transistor 215, the transistor pair 120, the terminal 103, and the p-type transistor 661. The source of the p-type transistor 216 may be connected to the terminal 103 and the source of the n-type transistor 215. The drain of the p-type transistor 216 may be connected to the source of the p-type transistor 661. The gate of the p-type transistor 216 may be connected to the transistor pair 120 (e.g., the gate of the p-type transistor 121).

In FIG. 6, the drain of the p-type transistor 661 may be connected to the drain of the n-type transistor 213. The source of the p-type transistor 661 may be connected to the drain of the p-type transistor 216. The gate of the p-type transistor 661 may be connected to the transistor pair 510 (e.g., the source of the p-type transistor 511), the impedance element 192, the gate of the n-type transistor 662, and the gate of the p-type transistor 561.

In FIG. 6, the source of the n-type transistor 662 may be connected to the drain of the n-type transistor 214. The drain of the n-type transistor 662 may be connected to the drain of the p-type transistor 232. The gate of the n-type transistor 662 may be connected to the transistor pair 510 (e.g., the source of the p-type transistor 511), the impedance element 192, the gate of the p-type transistor 661, and the gate of the p-type transistor 561.

In FIG. 6, the n-type transistor 213 may be a diode-connected transistor. The gate and the drain of the n-type transistor 213 may be connected. The n-type transistor 213 may be connected between the p-type transistor 661, the n-type transistor 214, and the terminal 102. The drain of the n-type transistor 213 may be connected to the drain of the p-type transistor 661. The source of the n-type transistor 213 may be connected to the terminal 102. The gate of the n-type transistor 213 may be connected to the gate of the n-type transistor 214.

In FIG. 6, the n-type transistor 214 may be connected between the n-type transistor 662, the n-type transistor 213, and the terminal 102. The drain of the n-type transistor 214 may be connected to the source of the n-type transistor 662. The source of the n-type transistor 214 may be connected to the terminal 102. The gate of the n-type transistor 214 may be connected to the gate of the n-type transistor 213. The n-type transistors 213 and 214 may form a current mirror.

In FIG. 6, the n-type transistor 231 may be a diode-connected transistor. The gate and the drain of the n-type transistor 231 may be connected. The n-type transistor 231 may be connected between the p-type transistor 212, the p-type transistor 232, and the transistor pair 130. The drain of the n-type transistor 231 may be connected to the drain of the p-type transistor 212. The source of the n-type transistor 231 may be connected to the source of the p-type transistor 232. The gate of the n-type transistor 232 may be connected to the transistor pair 130 (e.g., the gate of the n-type transistor 131). The n-type transistors 131 and 231 may form a current mirror.

In FIG. 6, the p-type transistor 232 may be a diode-connected transistor. The gate and the drain of the p-type transistor 232 may be connected. The p-type transistor 232 may be connected between the n-type transistor 231, the n-type transistor 662, and the transistor pair 130. The source of the p-type transistor 232 may be connected to the source of the n-type transistor 231. The drain of the p-type transistor 232 may be connected to the drain of the n-type transistor 662. The gate of the p-type transistor 232 may be connected to the transistor pair 130 (e.g., the gate of the p-type transistor 132). The p-type transistors 132 and 232 may form a current mirror. The n-type transistor 213 and the p-type transistor 214 may be a transistor pair or a gain transistor pair.

In bias voltage generating device 600, the n-type transistor 561 may cause a voltage drop between the terminal 102 and the transistor pair 130 (e.g., the p-type transistor 132). The n-type transistor 561 may protect the p-type transistor 132 from high voltage stress. In some embodiments, the bias voltage generating device 600 may not have the p-type transistor 561.

The p-type transistor 661 may cause a voltage drop between the transistors 213 and 216. The p-type transistor 661 may protect the p-type transistor 216 from high voltage stress. In some embodiments, the bias voltage generating device 600 may not have the p-type transistor 661.

The n-type transistor 662 may cause a voltage drop between the transistors 214 and 232. The n-type transistor 662 may protect the p-type transistor 214 from high voltage stress. In some embodiments, the bias voltage generating device 600 may not have the n-type transistor 662.

When VDD is provided at the terminal 101 and GND is provided at the terminal 102, the voltage applied to the gate of the transistor 561, the gate of the transistor 661, and the gate of the transistor 662 may be ⅓VDD.

Due to the sense section 610 and the gain section 230 in the bias voltage generating device 600, the output voltage at the terminal 103 may be more stable, and the error rate (e.g., variation) of the output voltage at the terminal 103 may be decreased.

Figure 7:
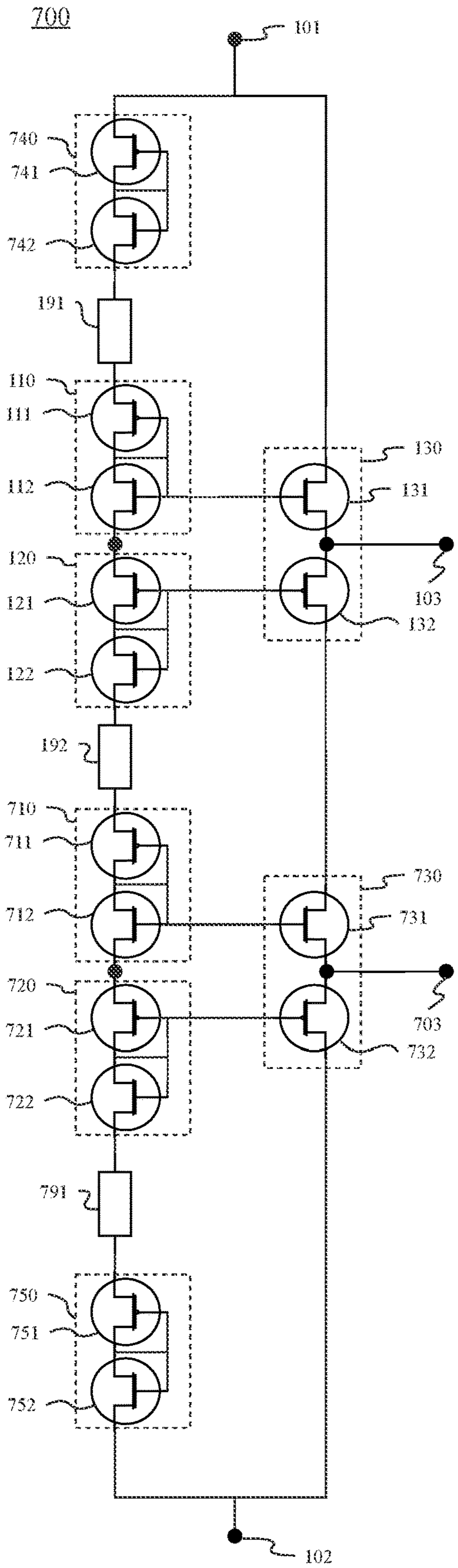
FIG. 7 is a schematic diagram of a bias voltage generating device in accordance with some embodiments of the present disclosure.

FIG. 7 is a schematic diagram of a bias voltage generating bias voltage generating device 700 in accordance with some embodiments of the present disclosure. Compared with the bias voltage generating device 100 in FIG. 1A, the bias voltage generating device 700 may further include an impedance element 791, transistor pairs 710, 720, 740, and 750, a transistor pair 730, and a terminal 703.

The terminal 703 may be an output terminal to output a bias voltage. The voltage terminal 703 may be a voltage terminal to drive an electronic device. When VDD is provided at the terminal 101 and GND is provided at the terminal 102, the output voltage of ⅔VDD is provided at the terminal 103 of the bias voltage generating device 700, and the output voltage of ⅓VDD is provided at the terminal 703 of the bias voltage generating device 700.

In FIG. 7, the transistor pair 710 may be or include a diode connected transistor pair. The transistor pair 710 may be connected between the impedance element 192 and the transistor pair 720. The transistor pair 710 may include a p-type transistor 711 and a n-type transistor 712. In some embodiments, each of the p-type transistor 711 and the n-type transistor 712 may be a diode-connected transistor. For example, the p-type transistor 711 may be a p-type MOSFET, and the drain and the gate of the p-type transistor 711 may be connected to each other. For example, the n-type transistor 712 may be a n-type MOSFET, and the drain and the gate of the n-type transistor 712 may be connected to each other. In the transistor pair 710, the drain and the gate of the p-type transistor 711 is connected to the drain and the gate of the n-type transistor 712.

In FIG. 7, the transistor pair 720 may be or include a diode connected transistor pair. The transistor pair 720 may be connected between the impedance element 791 and the transistor pair 710. The transistor pair 720 may include a p-type transistor 721 and a n-type transistor 722. In some embodiments, each of the p-type transistor 721 and the n-type transistor 722 may be a diode-connected transistor. For example, the p-type transistor 721 may be a p-type MOSFET, and the drain and the gate of the p-type transistor 721 may be connected to each other. For example, the n-type transistor 722 may be a n-type MOSFET, and the drain and the gate of the n-type transistor 722 may be connected to each other. In the transistor pair 720, the drain and the gate of the p-type transistor 721 is connected to the drain and the gate of the n-type transistor 722.

The transistor pairs 710 and 720 are connected. For example, the source of the n-type transistor 712 may be connected to the source of the p-type transistor 721.

In FIG. 7, the transistor pair 740 may be or include a diode connected transistor pair. The transistor pair 740 may be connected between the impedance element 191 and the terminal 101. The transistor pair 740 may include a p-type transistor 741 and a n-type transistor 742. In some embodiments, each of the p-type transistor 741 and the n-type transistor 742 may be a diode-connected transistor. For example, the p-type transistor 741 may be a p-type MOSFET, and the drain and the gate of the p-type transistor 741 may be connected to each other. For example, the n-type transistor 742 may be a n-type MOSFET, and the drain and the gate of the n-type transistor 742 may be connected to each other. In the transistor pair 740, the drain and the gate of the p-type transistor 741 is connected to the drain and the gate of the n-type transistor 742. The source of the p-type transistor 741 may be connected to the terminal 101. The source of the n-type transistor 742 may be connected to the impedance element 191.

In FIG. 7, the impedance element 791 may be connected between the transistor pairs 720 and 750. The impedance element 791 may be connected to source of the n-type transistor pair 722. The impedance element 791 may be connected to source of the p-type transistor pair 751.

In FIG. 7, the transistor pair 750 may be or include a diode connected transistor pair. The transistor pair 750 may be connected between the impedance element 791 and the terminal 102. The transistor pair 750 may include a p-type transistor 751 and a n-type transistor 752. In some embodiments, each of the p-type transistor 751 and the n-type transistor 752 may be a diode-connected transistor. For example, the p-type transistor 751 may be a p-type MOSFET, and the drain and the gate of the p-type transistor 751 may be connected to each other. For example, the n-type transistor 752 may be a n-type MOSFET, and the drain and the gate of the n-type transistor 752 may be connected to each other. In the transistor pair 750, the drain and the gate of the p-type transistor 751 is connected to the drain and the gate of the n-type transistor 752. The source of the p-type transistor 751 may be connected to the impedance element 791. The source of the n-type transistor 752 may be connected to the terminal 102.

In FIG. 7, a reference bias section of the bias voltage generating device 700 may include the impedance elements 191, 192, and 791, and the transistor pairs 110, 120, 710, 720, 740, and 750.

The transistor pair 730 may be connected between the transistor pair 130 and the terminals 102 and 703. The transistor pair 730 may be connected to the drain of the p-type transistor 132. The transistor pair 730 may include a n-type transistor 731 and a p-type transistor 732. For example, the n-type transistor 731 may be a n-type MOSFET, and the p-type transistor 732 may be a p-type MOSFET. The source of the n-type transistor 731 may be connected to the source of the p-type transistor 732. The gate of the n-type transistor 731 may be connected to the transistor pair 710. The gate of the n-type transistor 731 may be connected to the gate of the n-type transistor 712. The gate of the p-type transistor 732 may be connected to the transistor pair 720. The gate of the p-type transistor 732 may be connected to the gate of the p-type transistor 721. The terminal 703 may be connected to the source of the n-type transistor 731 and the source of the p-type transistor 732.

In FIG. 7, a driving section of the bias voltage generating device 700 may include the transistor pairs 130 and 730.

Figure 8A:
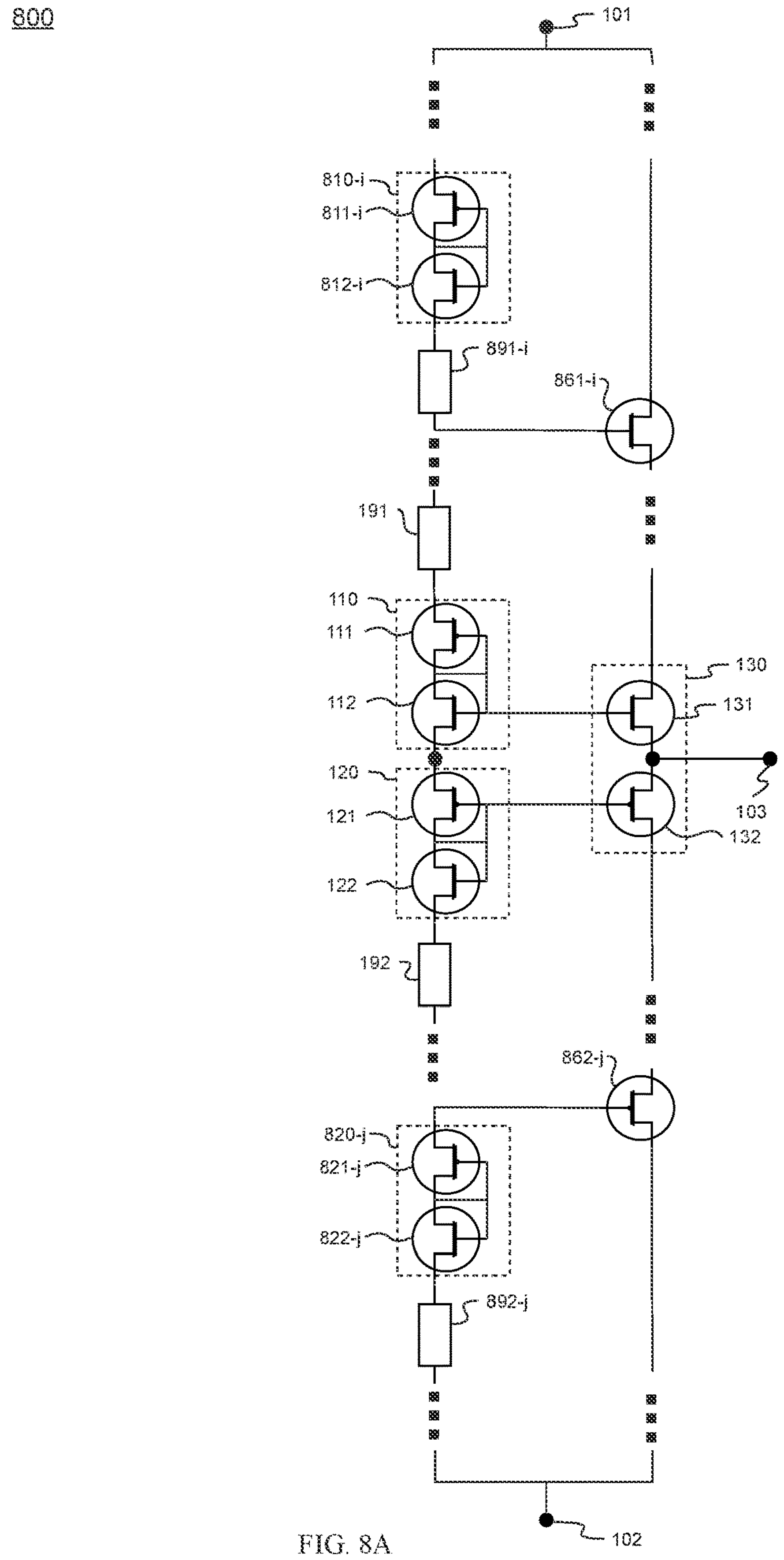
FIG. 8A is a schematic diagram of a bias voltage generating device in accordance with some embodiments of the present disclosure.

FIG. 8A is a schematic diagram of a bias voltage generating device 800 in accordance with some embodiments of the present disclosure. Compared with the bias voltage generating device 100 in FIG. 1A, the bias voltage generating device 800 may further include impedance elements 891-*i* and 892-*j*, transistor pairs 810-*i* and 820-*j*, a n-type transistor 861-*i* (e.g., a n-type MOSFET), and a p-type transistor 862-*j* (e.g., a p-type MOSFET).

In the bias voltage generating device 800, 0≤i≤M and 0≤j≤N, where i, j, M, and N may be non-negative integers. For example, when M is 5, i may be 0, 1, 2, 3, 4, and 5; when N is 4, j may be 0, 1, 2, 3, and 4. In embodiments in which both M and N are 0, the bias voltage generating device 800 may be substantially identical to the bias voltage generating device 100.

When VDD is provided at the terminal 101 and GND is provided at the terminal 102, the output voltage of $$\frac{(1+N)}{(2+M+N)}VDD$$

is provided at the terminal 103 of the bias voltage generating device 800, where the variants M and N may represent non-negative integers. For example, if both M and N are 0, the output voltage of ½VDD is provided at the terminal 103 of the bias voltage generating device 800. If M is 1 and N is 2, the output voltage of ⅗VDD is provided at the terminal 103 of the bias voltage generating device 800.

In FIG. 8A, the transistor pair 810-*i* may be or include a diode connected transistor pair. The transistor pair 810-*i* may be connected between the impedance element 891-*i* and the terminal 101. The transistor pair 810-*i* may include a p-type transistor 811-*i* and a n-type transistor 812-*i*. In some embodiments, each of the p-type transistor 811-*i* and the n-type transistor 812-*i* may be a diode-connected transistor. For example, the p-type transistor 811-*i* may be a p-type MOSFET, and the drain and the gate of the p-type transistor 811-*i* may be connected to each other. For example, the n-type transistor 812-*i* may be a n-type MOSFET, and the drain and the gate of the n-type transistor 812-*i* may be connected to each other. In the transistor pair 810-*i*, the drain and the gate of the p-type transistor 811-*i* is connected to the drain and the gate of the n-type transistor 812-*i*. The source of the n-type transistor 812-*i* may be connected to the impedance element 891-*i*.

In FIG. 8A, the impedance element 891-*i* may be connected to the transistor pair 810-*i* (e.g., source of the n-type transistor 812-*i*) and the gate of n-type transistor 861-*i*.

In some embodiments, the sequence of the impedance element 891-*i* and the diode connected pair 810-*i* may be reversed. For example, the impedance element 891-*i* may be connected to the source of the p-type transistor 811-*i*, and the source of the n-type transistor 812-*i* may be connected to the gate of the n-type transistor 861-*i* and the impedance element 192.

In FIG. 8A, the n-type transistor 861-*i* may be connected between the terminal 101, the impedance element 891-*i*, and the transistor pair 130. The drain of the n-type transistor 861-*i* may be connected to the terminal 101. The source of the n-type transistor 861-*i* may be connected to the drain of the n-type transistor 131. The gate of the n-type transistor 861-*i* may be connected to the impedance element 891-*i*.

In FIG. 8A, the n-type transistor 861-*i* may cause a voltage drop between the terminal 101 and the transistor pair 130 (e.g., the n-type transistor 131). The n-type transistor 861-*i* may protect the n-type transistor 131 from high voltage stress. In some embodiments, the bias voltage generating device 800 may not have the n-type transistor 861-*i*.

In FIG. 8A, the transistor pair 820-*j* may be or include a diode connected transistor pair. The transistor pair 820-*j* may be connected to the impedance element 892-*j*. The transistor pair 820-*j* may include a p-type transistor 821-*j* and a n-type transistor 822-*j*. In some embodiments, each of the p-type transistor 821-*j* and the n-type transistor 822-*j* may be a diode-connected transistor. For example, the p-type transistor 821-*j* may be a p-type MOSFET, and the drain and the gate of the p-type transistor 821-*j* may be connected to each other. For example, the n-type transistor 822-*j* may be a n-type MOSFET, and the drain and the gate of the n-type transistor 822-*j* may be connected to each other. In the transistor pair 820-*j*, the drain and the gate of the p-type transistor 821-*j* may be connected to the drain and the gate of the n-type transistor 822-*j*. The source of the n-type transistor 822-*j* may be connected to the impedance element 892-*j*.

In FIG. 8A, the impedance element 892-*j* may be connected between the transistor pair 820-*j* (e.g., source of the n-type transistor 822-*j*) and the terminal 102.

In some embodiments, the sequence of the impedance element 892-*j* and the diode connected pair 820-*j* may be reversed. For example, the impedance element 892-*j* may be connected between the source of the p-type transistor 821-*j*, the gate of the p-type transistor 862-*j*, and the impedance element 192, and the source of the n-type transistor 822-*j* may be connected to the terminal 102.

In FIG. 8A, the p-type transistor 862-*j* may be connected between the terminal 102, the impedance element 192, and the transistor pair 130. The drain of the p-type transistor 862-*j* may be connected to the terminal 102. The source of the p-type transistor 862-*j* may be connected to the drain of the p-type transistor 132. The gate of the p-type transistor 862-*j* may be connected to diode connected pair 820-*j* (e.g., the source of the p-type transistor 821-*i*).

In FIG. 8A, the p-type transistor 862-*j* may cause a voltage drop between the terminal 101 and the transistor pair 130 (e.g., the p-type transistor 132). The p-type transistor 862-*j* may protect the p-type transistor 132 from high voltage stress. In some embodiments, the bias voltage generating device 800 may not have the p-type transistor 862-*j*.

The bias voltage generating device 800 may include a reference bias section and a driving section. The reference bias section may include the transistor pairs 110, 120, 810-*i*, and 820-*j*, and impedance elements 191, 192, 891-*i*, and 892-*j*. The driving section may include the transistor pair 130 and transistors 861-*i* and 862-*j*.

In embodiments in which M is 0, the bias voltage generating device 800 may not include the impedance element 891-*i*, the transistor pair 810-*i*, and the type transistor 861-*i*.

Figure 8B:
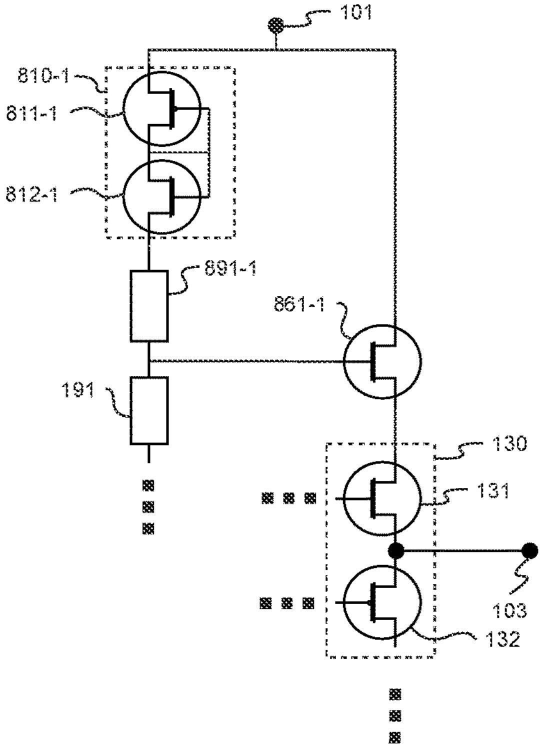
FIGS. 8B-8E are schematic diagrams of portions of bias voltage generating devices in accordance with some embodiments of the present disclosure.

FIG. 8B is a schematic diagram of a portion of bias voltage generating device 800 in accordance with some embodiments of the present disclosure. In particular, FIG. 8B is a schematic diagram of a portion of bias voltage generating device 800 in accordance with embodiments in which M is 1.

In FIG. 8B, the impedance element 891-1 may be connected between the impedance element 191 and the transistor pair 810-1 (e.g., the source of the n-type transistor 812-1) and connected to the gate of the n-type transistor 861-1. The transistor pair 810-1 may be connected between the impedance element 891-1 and the terminal 101 (through the source of the p-type transistor 811-1). The drain of the n-type transistor 861-1 may be connected to the terminal 101. The source of the n-type transistor 861-1 may be connected to the transistor pair 130 (e.g., the drain of the n-type transistor 131).

Figure 8C:
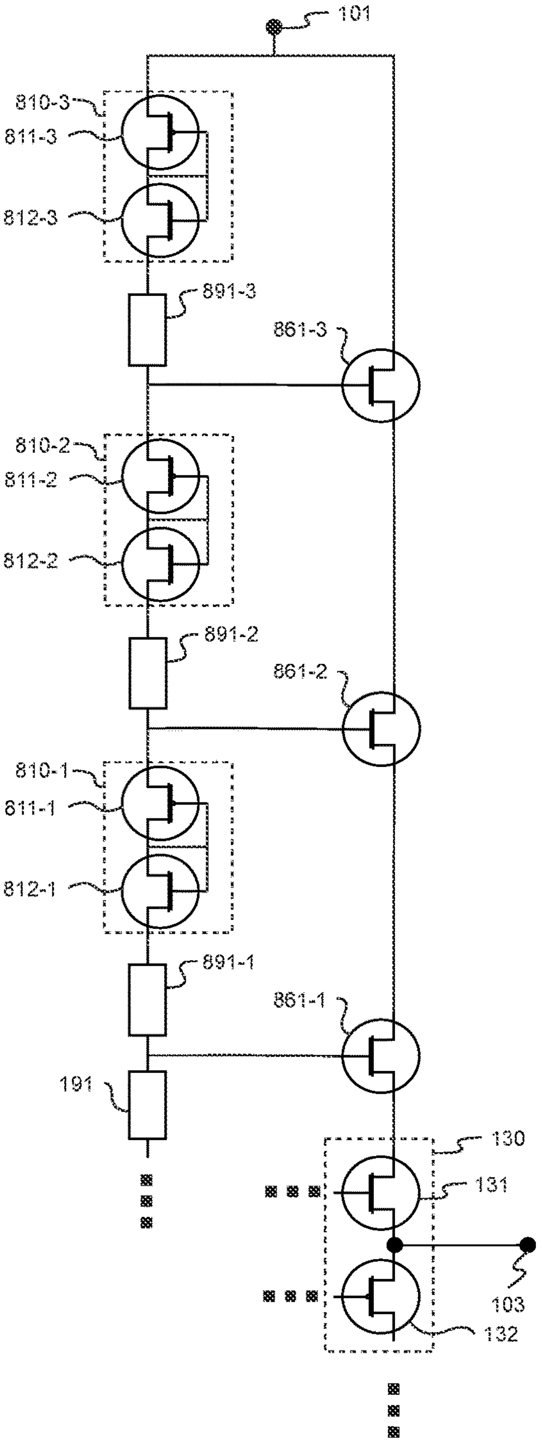

FIG. 8C is a schematic diagram of a portion of bias voltage generating device 800 in accordance with some embodiments of the present disclosure. In particular, FIG. 8C is a schematic diagram of a portion bias voltage generating device 800 in accordance with embodiments in which M is 3.

In FIG. 8C, the impedance element 891-1 may be connected between the impedance element 191 and the transistor pair 810-1 (e.g., the source of the n-type transistor 812-1), and the gate of the n-type transistor 861-1. The transistor pair 810-1 may be connected between the impedance element 891-1 (through the source of the n-type transistor 812-1) and the impedance element 891-2 (through the source of the p-type transistor 811-1) and connected to the gate of the n-type transistor 861-2 (through the source of the p-type transistor 811-1). The drain of the n-type transistor 861-1 may be connected to the source of the n-type transistor 861-2. The source of the n-type transistor 861-1 may be connected to the transistor pair 130 (e.g., the drain of the n-type transistor 131).

In FIG. 8C, the impedance element 891-2 may be connected between the transistor pair 810-1 (e.g., the source of the p-type transistor 811-1), the transistor pair 810-2 (e.g., the source of the n-type transistor 812-2), and the gate of the n-type transistor 861-2. The transistor pair 810-2 may be connected between the impedance element 891-2 (through the source of the n-type transistor 812-2), the impedance element 891-3 (through the source of the p-type transistor 811-2), and the gate of the n-type transistor 861-3 (through the source of the p-type transistor 811-2). The drain of the n-type transistor 861-2 may be connected to the source of the n-type transistor 861-3. The source of the n-type transistor 861-2 may be connected to the drain of the n-type transistor 861-1.

In FIG. 8C, the impedance element 891-3 may be connected between the transistor pair 810-2 (e.g., the source of the p-type transistor 811-2) and the transistor pair 810-3 (e.g., the source of the n-type transistor 812-2) and connected to the gate of the n-type transistor 861-3. The transistor pair 810-3 may be connected between the impedance element 891-3 (through the source of the n-type transistor 812-3) and the terminal 101 (through the source of the p-type transistor 811-3). The drain of the n-type transistor 861-3 may be connected to terminal 101. The source of the n-type transistor 861-3 may be connected to the drain of the n-type transistor 861-2.

In embodiments in which N is 0, the bias voltage generating device 800 may not include the impedance element 892-*j*, the transistor pair 820-*j*, and the p-type transistor 862-*j*.

Figure 8D:
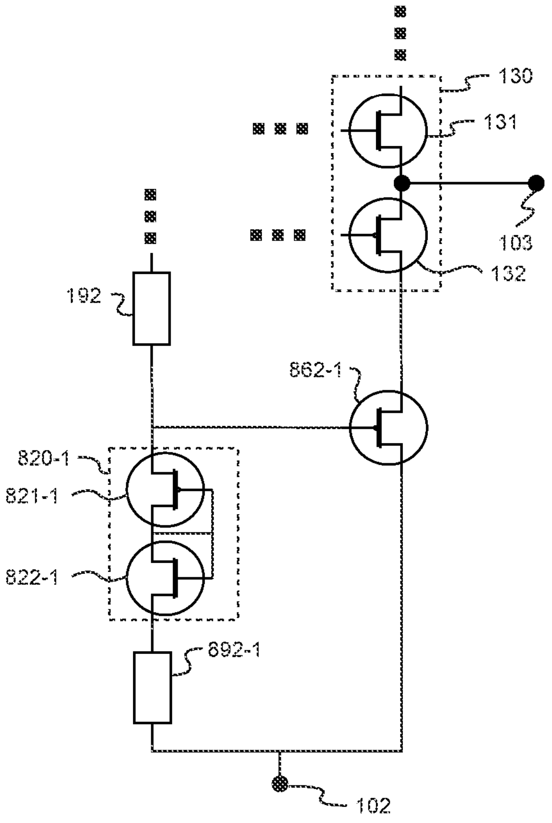

FIG. 8D is a schematic diagram of a portion of bias voltage generating device 800 in accordance with some embodiments of the present disclosure. In particular, FIG. 8D is a schematic diagram of a portion of bias voltage generating device 800 in accordance with embodiments in which N is 1.

In FIG. 8D, the impedance element 892-1 may be connected between the terminal 102 and the transistor pair 820-1 (e.g., the source of the n-type transistor 822-1). The transistor pair 820-1 may be connected between the impedance element 892-1 and the impedance element 192 (through the source of the p-type transistor 821-1) and connected to the gate of the p-type transistor 862-1 (through the source of the p-type transistor 821-1). The drain of the p-type transistor 862-1 may be connected to the terminal 102. The source of the p-type transistor 862-1 may be connected to the transistor pair 130 (e.g., the drain of the p-type transistor 132).

Figure 8E:
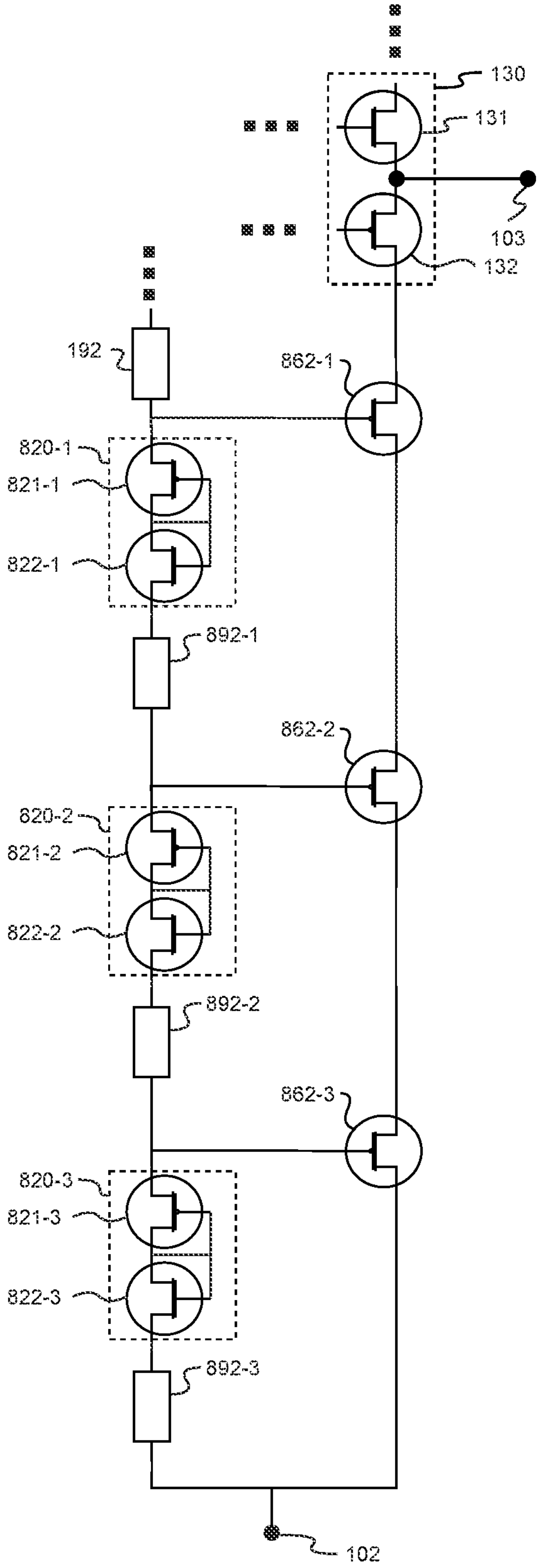

FIG. 8E is a schematic diagram of a portion of bias voltage generating device 800 in accordance with some embodiments of the present disclosure. In particular, FIG. 8E is a schematic diagram of a portion bias voltage generating device 800 in accordance with embodiments in which N is 3.

In FIG. 8E, the impedance element 892-1 may be connected between the transistor pair 820-1 (e.g., the source of the n-type transistor 822-1) and the transistor pair 820-2 (e.g., the source of the p-type transistor 821-2) and connected to the gate of the p-type transistor 862-1. The transistor pair 820-*i* may be connected between the impedance element 192 (through the source of the p-type transistor 821-1), the impedance element 892-1 (through the source of the n-type transistor 822-1), and the gate of the p-type transistor 862-1 (through the source of the p-type transistor 821-1). The drain of the p-type transistor 862-1 may be connected to the source of the p-type transistor 862-2. The source of the p-type transistor 862-1 may be connected to the transistor pair 130 (e.g., the drain of the p-type transistor 132).

In FIG. 8E, the impedance element 892-2 may be connected between the transistor pair 820-2 (e.g., the source of the n-type transistor 822-2), the transistor pair 820-3 (e.g., the source of the p-type transistor 821-3), and the gate of the p-type transistor 862-3. The transistor pair 820-2 may be connected between the impedance element 892-2 (through the source of the n-type transistor 822-2) and the impedance element 892-1 (through the source of the p-type transistor 821-2) and connected to the gate of the p-type transistor 862-2 (through the source of the p-type transistor 821-2). The drain of the p-type transistor 862-2 may be connected to the source of the p-type transistor 862-3. The source of the p-type transistor 862-2 may be connected to the drain of the p-type transistor 862-1.

In FIG. 8E, the impedance element 892-3 may be connected between the transistor pair 820-3 (e.g., the source of the n-type transistor 822-3) and the terminal 102. The transistor pair 820-3 may be connected between the impedance element 892-3 (through the source of the n-type transistor 822-3), the impedance element 892-2 (through the source of the p-type transistor 821-3), and the gate of the p-type transistor 862-3 (through the source of the p-type transistor 821-3). The drain of the p-type transistor 862-3 may be connected to terminal 102. The source of the p-type transistor 862-3 may be connected to the drain of the n-type transistor 862-2.

Figure 9A:
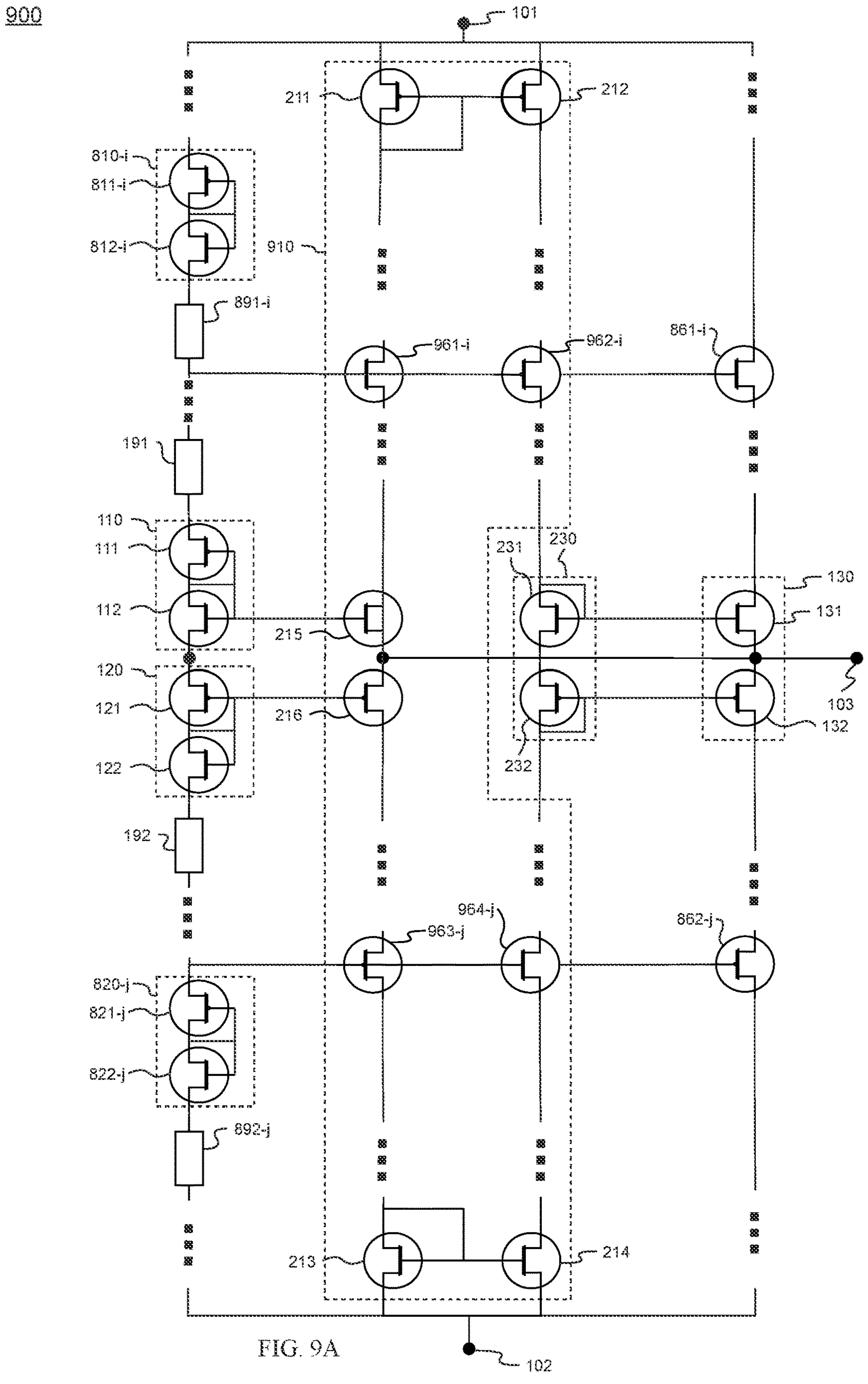
FIG. 9A is a schematic diagram of a bias voltage generating device in accordance with some embodiments of the present disclosure.

FIG. 9A is a schematic diagram of a bias voltage generating device 900 in accordance with some embodiments of the present disclosure. Compared with the bias voltage generating device 900 in FIG. 8A, the bias voltage generating device 900 may further include a sense section 910 and a gain section 230. Compared with the bias voltage generating device 800 in FIG. 8A, the bias voltage generating device 900 may include a further push-pull stage. Compared with the bias voltage generating device 800 in FIG. 8A, the bias voltage generating device 900 may include a negative feedback function.

In FIG. 9A, the bias voltage generating device 900 may include p-type transistors 211, 212, 216, 232, 862-*j*, 962-*i*, and 963-*j* (e.g., p-type MOSFETs) and n-type transistors 213, 214, 215, 231, 861-*i*, 961-*i*, and 964-*j* (e.g., n-type MOSFETs). The sense section 910 may include the p-type transistors 211, 212, 216, 962-*i*, and 963-*j* (e.g., p-type MOSFETs) and the n-type transistors 213, 214, 215, 961-*i*, and 964-*j* (e.g., n-type MOSFETs). The gain section 230 may include the p-type transistor 232 (e.g., a p-type MOSFET) and the n-type transistor 231 (e.g., a n-type MOSFET). The reference bias section may include the transistor pairs 110, 120, 810-*i*, and 820-*j*, and impedance elements 191, 192, 891-*i*, and 892-*j*. The driving section may include the transistor pair 130 and transistors 861-*i* and 862-*j*.

In FIG. 9A, the p-type transistor 211 may be a diode-connected transistor. The gate and the drain of the p-type transistor 211 may be connected. The p-type transistor 211 may be connected to the terminal 101, the p-type transistor 212, and the n-type transistor 961-*i*. The source of the p-type transistor 211 may be connected to the terminal 101. The drain of the p-type transistor 211 may be connected to the drain of the n-type transistor 961-*i*. The gate of the p-type transistor 211 may be connected to the gate of the p-type transistor 212.

In FIG. 9A, the p-type transistor 212 may be connected between the terminal 101, the p-type transistor 212, and the p-type transistor 962-*i*. The source of the p-type transistor 212 may be connected to the terminal 101. The drain of the p-type transistor 212 may be connected to the source of the p-type transistor 962-*i*. The gate of the p-type transistor 212 may be connected to the gate of the p-type transistor 211. The p-type transistors 211 and 212 may form a current mirror.

In FIG. 9A, the drain of the n-type transistor 961-*i* may be connected to the drain of the p-type transistor 211. The source of the n-type transistor 961-*i* may be connected to the drain of the n-type transistor 215. The gate of the n-type transistor 961-*i* may be connected to the impedance element 191, the impedance element 891-*i*, the gate of the p-type transistor 962-*i*, and the gate of the n-type transistor 861-*i*.

In FIG. 9A, the source of the p-type transistor 962-*i* may be connected to the drain of the p-type transistor 212. The drain of the p-type transistor 962-*i* may be connected to the drain of the n-type transistor 231. The gate of the p-type transistor 962-*i* may be connected to the impedance element 191, the impedance element 891-*i*, the gate of the n-type transistor 961-*i*, and the gate of the n-type transistor 861-*i*.

In FIG. 9A, the n-type transistor 215 may be connected between the n-type transistor 961-*i*, the transistor pair 110, the terminal 103, and the p-type transistor 216. The drain of the n-type transistor 215 may be connected to the source of the n-type transistor 961-*i*. The source of the n-type transistor 215 may be connected to the terminal 103 and the source of the p-type transistor 216. The gate of the n-type transistor 215 may be connected to the transistor pair 110 (e.g., the gate of the n-type transistor 112).

In FIG. 9A, the p-type transistor 216 may be connected between the n-type transistor 215, the transistor pair 120, the terminal 103, and the p-type transistor 963-*j*. The source of the p-type transistor 216 may be connected to the terminal 103 and the source of the n-type transistor 215. The drain of the p-type transistor 216 may be connected to the source of the p-type transistor 963-*j*. The gate of the p-type transistor 216 may be connected to the transistor pair 120 (e.g., the gate of the p-type transistor 121).

In FIG. 9A, the drain of the p-type transistor 963-*j* may be connected to the drain of the n-type transistor 213. The source of the p-type transistor 963-*j* may be connected to the drain of the p-type transistor 216. The gate of the p-type transistor 963-*j* may be connected to the transistor pair 820-*j* (e.g., the source of the p-type transistor 820-*j*), the impedance element 192, the gate of the n-type transistor 964-*j*, and the gate of the p-type transistor 862-*j*.

In FIG. 9A, the source of the n-type transistor 964-*j* may be connected to the drain of the n-type transistor 214. The drain of the n-type transistor 964-*j* may be connected to the drain of the p-type transistor 232. The gate of the n-type transistor 964-*j* may be connected to the transistor pair 820-*j* (e.g., the source of the p-type transistor 821-*j*), the impedance element 192, the gate of the p-type transistor 963-*j*, and the gate of the p-type transistor 862-*j*.

In FIG. 9A, the n-type transistor 213 may be a diode-connected transistor. The gate and the drain of the n-type transistor 213 may be connected. The n-type transistor 213 may be connected between the p-type transistor 963-*j*, the n-type transistor 214, and the terminal 102. The drain of the n-type transistor 213 may be connected to the drain of the p-type transistor 963-*j*. The source of the n-type transistor 213 may be connected to the terminal 102. The gate of the n-type transistor 213 may be connected to the gate of the n-type transistor 214.

In FIG. 9A, the n-type transistor 214 may be connected between the n-type transistor 964-*j*, the n-type transistor 213, and the terminal 102. The drain of the n-type transistor 214 may be connected to the source of the n-type transistor 964-*j*. The source of the n-type transistor 214 may be connected to the terminal 102. The gate of the n-type transistor 214 may be connected to the gate of the n-type transistor 213. The n-type transistors 213 and 214 may form a current mirror.

In FIG. 9A, the n-type transistor 231 may be a diode-connected transistor. The gate and the drain of the n-type transistor 231 may be connected. The n-type transistor 231 may be connected between the p-type transistor 962-*i*, the p-type transistor 232, and the transistor pair 130. The drain of the n-type transistor 231 may be connected to the drain of the p-type transistor 962-*i*. The source of the n-type transistor 231 may be connected to the source of the p-type transistor 232. The gate of the n-type transistor 232 may be connected to the transistor pair 130 (e.g., the gate of the n-type transistor 131). The n-type transistors 131 and 231 may form a current mirror.

In FIG. 9A, the p-type transistor 232 may be a diode-connected transistor. The gate and the drain of the p-type transistor 232 may be connected. The p-type transistor 232 may be connected between the n-type transistor 231, the type transistor 964-*j*, and the transistor pair 130. The source of the p-type transistor 232 may be connected to the source of the n-type transistor 231. The drain of the p-type transistor 232 may be connected to the drain of the n-type transistor 964-*j*. The gate of the p-type transistor 232 may be connected to the transistor pair 130 (e.g., the gate of the p-type transistor 132). The p-type transistors 132 and 232 may form a current mirror. The n-type transistor 213 and the p-type transistor 214 may be a transistor pair or a gain transistor pair.

In bias voltage generating device 900, the n-type transistor 961-*i* may cause a voltage drop between the transistors 211 and 215. The n-type transistor 961-*i* may protect the n-type transistor 215 from high voltage stress. In some embodiments, the bias voltage generating device 900 may not have the n-type transistor 961-*i*. The p-type transistor 962-*i* may cause a voltage drop between the transistors 212 and 231. The p-type transistor 962-*i* may protect the p-type transistor 212 from high voltage stress. In some embodiments, the bias voltage generating device 900 may not have the p-type transistor 962-*i*.

In the bias voltage generating device 900, the p-type transistor 963-*j* may cause a voltage drop between the transistors 213 and 216. The p-type transistor 963-*j* may protect the p-type transistor 216 from high voltage stress. In some embodiments, the bias voltage generating device 900 may not have the p-type transistor 963-*j*. The n-type transistor 964-*j* may cause a voltage drop between the transistors 214 and 232. The n-type transistor 964-*j* may protect the p-type transistor 214 from high voltage stress. In some embodiments, the bias voltage generating device 900 may not have the n-type transistor 964-*j*.

In the bias voltage generating device 900, 0≤i≤M and 0≤j≤N, where i, j, M, and N may be non-negative integers. For example, when M is 5, i may be 0, 1, 2, 3, 4, and 5; when N is 4, j may be 0, 1, 2, 3, and 4. In embodiments in which both M and N are 0, the bias voltage generating device 900 may be substantially identical the bias voltage generating device 200.

When VDD is provided at the terminal 101 and GND is provided at the terminal 102, the output voltage of $$\frac{(1+N)}{(2+M+N)}VDD$$

is provided at the terminal 103 of the bias voltage generating device 900, where the variants NI and N may represent non-negative integers. For example, if both M and N are 0, the output voltage of ½VDD is provided at the terminal 103 of the bias voltage generating device 900 if M is 1 and N is 2, the output voltage of ⅗VDD is provided at the terminal 103 of the bias voltage generating device 900.

Because of the sense section 910 and the gain section 230 in the bias voltage generating device 900, the output voltage at the terminal 103 may be more stable, and the error rate (e.g., variation) of the output voltage at the terminal 103 may be decreased.

In embodiments in which M is 0, the bias voltage generating device 900 may not include the impedance element 891-*i*, the transistor pair 810-*i*, the n-type transistor 961-*i*, the p-type transistor 962-*i*, and the n-type transistor 861-*i*.

Figure 9B:
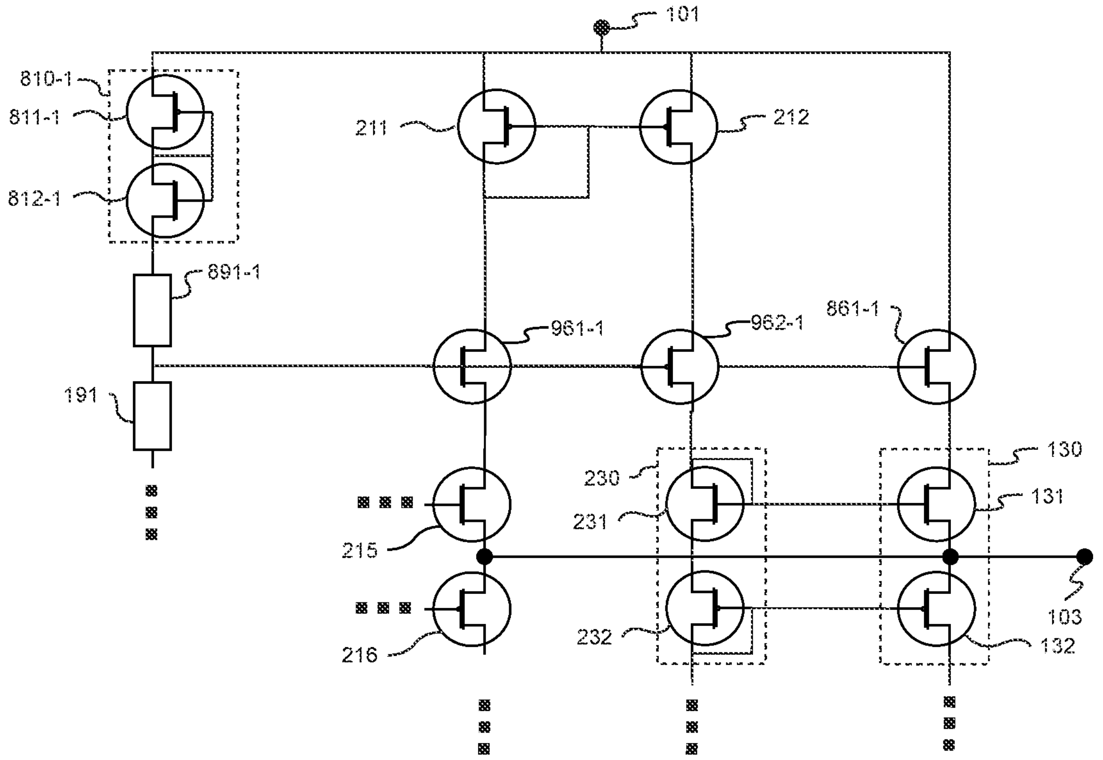
FIGS. 9B-9E are schematic diagrams of portions of bias voltage generating devices in accordance with some embodiments of the present disclosure.

FIG. 9B is a schematic diagram of a portion of bias voltage generating device 800 in accordance with some embodiments of the present disclosure. In particular, FIG. 9B is a schematic diagram of a portion bias voltage generating device 800 in accordance with embodiments in which M is 1. FIG. 9B clearly discloses the coupling between components in embodiments in which M is 1.

Figure 9C:
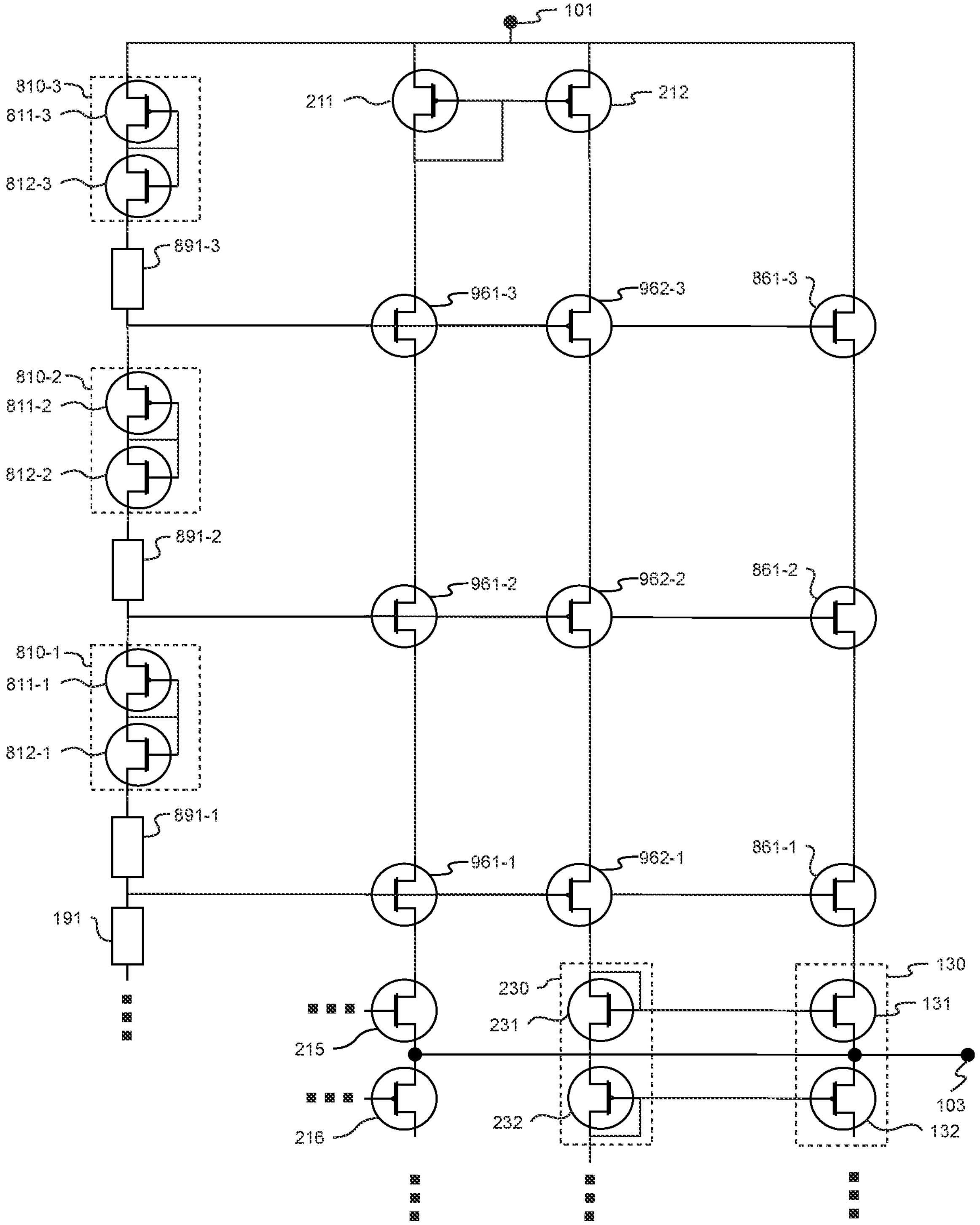

FIG. 9C is a schematic diagram of a portion of bias voltage generating device 800 in accordance with some embodiments of the present disclosure. In particular, FIG. 9C is a schematic diagram of a portion of bias voltage generating device 800 in accordance with embodiments in which M is 3. FIG. 9*c* clearly discloses coupling between components in embodiments in which M is 3.

In embodiments in which N is 0, the bias voltage generating device 900 may not include the impedance element 892-*j*, the transistor pair 820-*j*, the p-type transistor 963-*j*, the n-type transistor 964-*j*, and the p-type transistor 862-*j*.

Figure 9D:
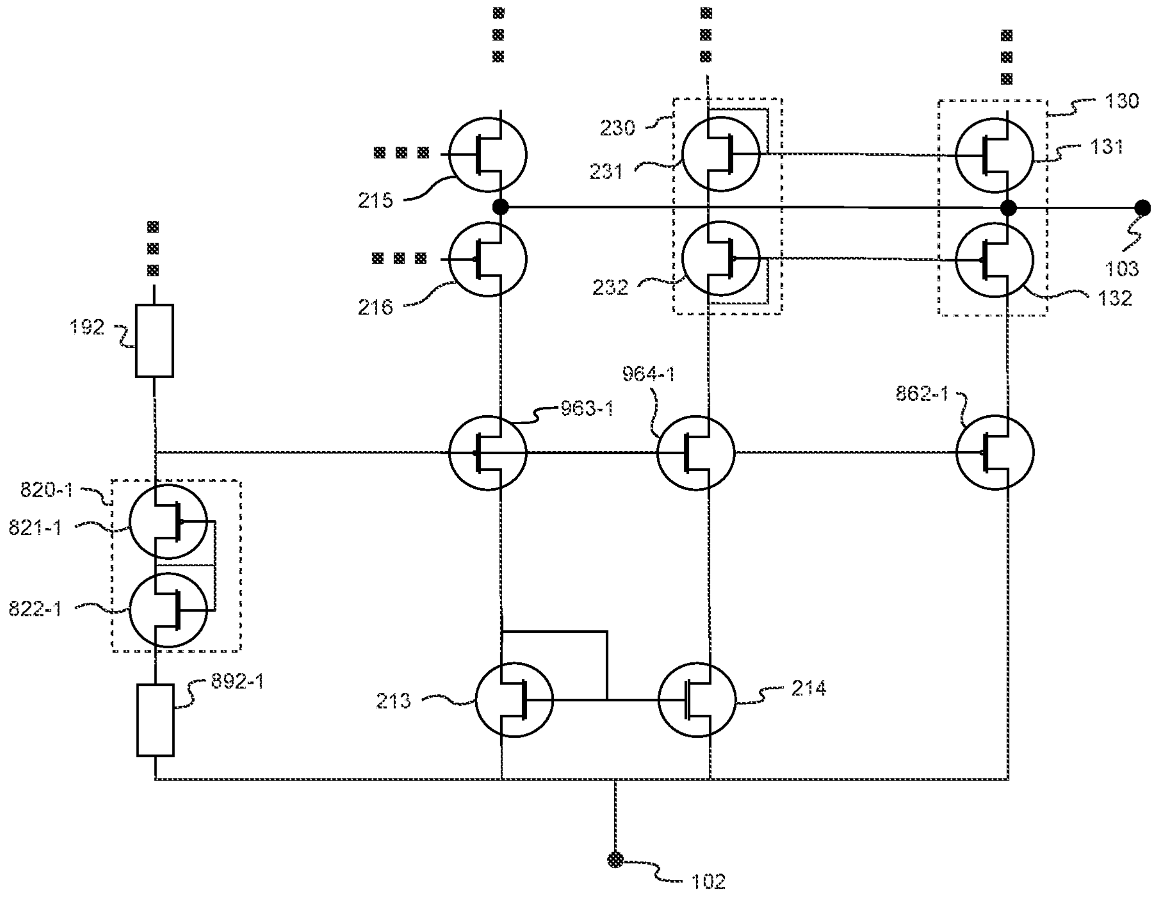
Figure 9E:
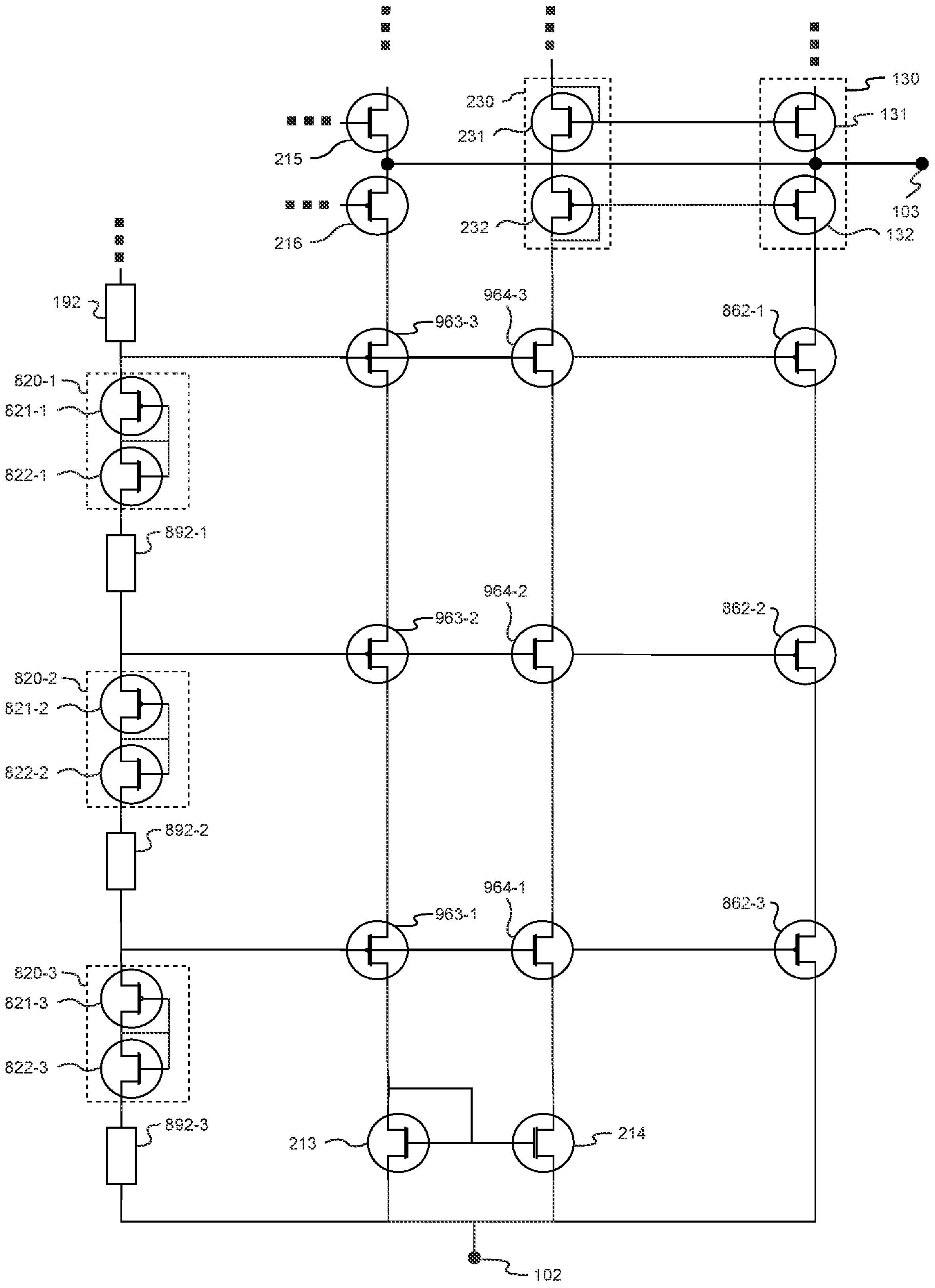

FIG. 9D is a schematic diagram of a portion of bias voltage generating device 800 in accordance with some embodiments of the present disclosure. In particular, FIG. 9D is a schematic diagram of a portion bias voltage generating device 800 in accordance with embodiments in which N is 1. FIG. 9D clearly discloses coupling between components in embodiments in which N is 1, FIG. 9E is a schematic diagram of a portion of bias voltage generating device 800 in accordance with some embodiments of the present disclosure. In particular, FIG. 9E is a schematic diagram of a portion bias voltage generating device 800 in accordance with embodiments in which N is 3. FIG. 9E clearly discloses coupling between components in embodiments in which N is 3.

Figure 10:
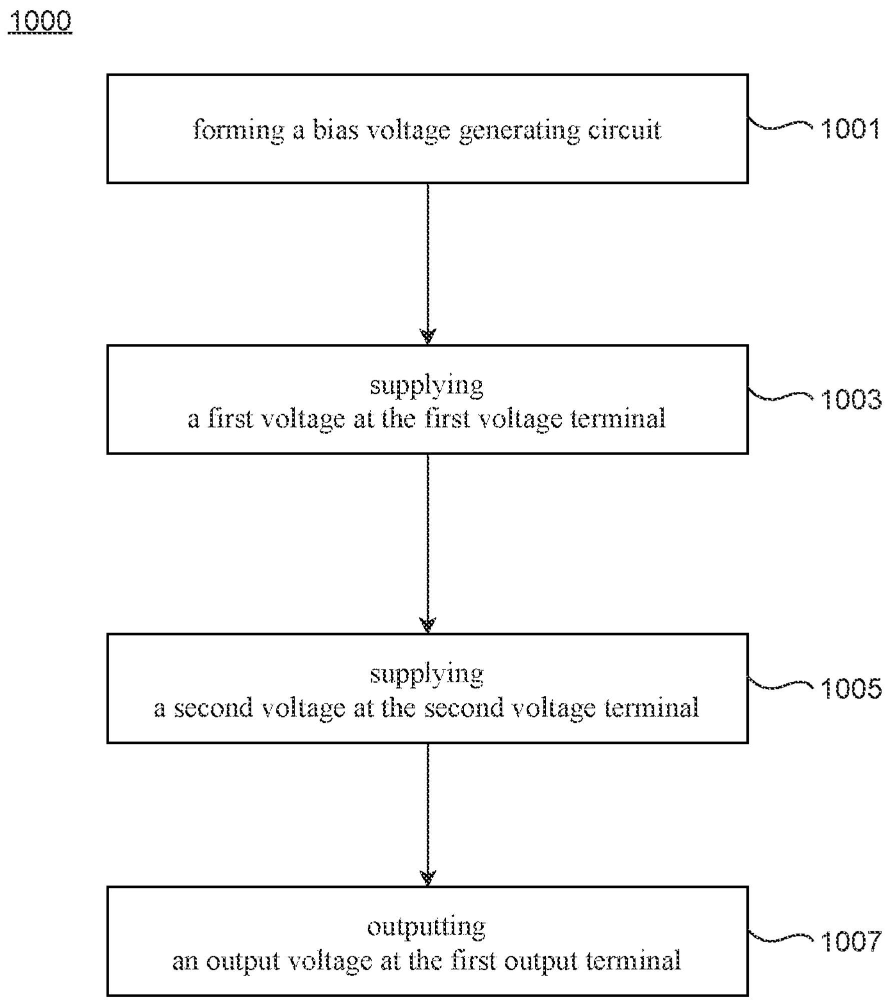
FIG. 10 is a flowchart of a method for manufacturing a bias voltage generating circuit in accordance with some embodiments of the present disclosure.

FIG. 10 is a flowchart of a method 1000 for generating bias voltage in accordance with some embodiments of the present disclosure. In operation 1001, a bias voltage generating circuit may be formed. The bias voltage generating circuit may comprise: a first voltage terminal; a second voltage terminal; a first output terminal; a reference bias section connected to the first voltage terminal and the second voltage terminal; and a driving section connected to the reference bias section, the first voltage terminal and the second voltage terminal. The reference bias section may comprise a first impedance element, a second impedance element, a first diode-connected transistor pair, and a second diode-connected transistor pair. The driving section may comprise a first transistor pair.

In operation 1003, a first voltage may be supplied at the first voltage terminal. In operation 1005, a second voltage may be supplied at the second voltage terminal. In operation 1007, an output voltage may be output or generated at the first output terminal. The output voltage may be half of a voltage difference between the first voltage and the second voltage.

In some embodiments, the bias voltage generating circuit may further comprise a sense section and a gain section. The sense section may be connected to the first voltage terminal and the second voltage terminal. The sense section may comprise a second transistor pair, a first current mirror, and a second current mirror. The gain section may be connected to the first transistor pair, the first current mirror, and the second current mirror. The gain section may include a diode-connected n-type transistor and a diode-connected p-type transistor.

In some embodiments, the present disclosure provides a bias voltage generating device. The bias voltage generating device includes a first voltage terminal; a second voltage terminal; a first output terminal; a first diode-connected transistor pair; a second diode-connected transistor pair; a first impedance element; a second impedance element; and a first transistor pair. The first impedance element is connected to the first voltage terminal and the first diode-connected transistor pair. The first diode-connected transistor pair is connected to the first impedance element and the second diode-connected transistor pair. The second diode-connected transistor pair is connected to the first diode-connected transistor pair and the second impedance element. The second impedance element is connected to the second diode-connected transistor pair and the second voltage terminal. The first transistor pair connected to the first voltage terminal, the second voltage terminal, the first output terminal, the first diode-connected transistor pair, and the second diode-connected transistor pair.

In some embodiments, the present disclosure provides a bias voltage generating device. The bias voltage generating device includes a first voltage terminal; a second voltage terminal; a first output terminal; a reference bias section connected to the first voltage terminal and the second voltage terminal; and a driving section connected to the reference bias section, the first voltage terminal and the second voltage terminal. The reference bias section comprises a first impedance element, a second impedance element, a first diode-connected transistor pair, and a second diode-connected transistor pair. The driving section comprising a first transistor pair. The bias voltage generating device is configured to generate an output voltage at the first output terminal, the output voltage is half of a voltage difference between the first voltage terminal and the second voltage terminal.

In some embodiments, the present disclosure provides a method for generating bias voltage. The method includes forming a bias voltage generating circuit; supplying a first voltage at the first voltage terminal; supplying a second voltage at the second voltage terminal; outputting an output voltage at the first output terminal, wherein the output voltage is half of a voltage difference between the first voltage and the second voltage. The bias voltage generating circuit comprises: a first voltage terminal; a second voltage terminal; a first output terminal; a reference bias section connected to the first voltage terminal and the second voltage terminal; and a driving section connected to the reference bias section, the first voltage terminal and the second voltage terminal. The reference bias section comprises a first impedance element, a second impedance element, a first diode-connected transistor pair, and a second diode-connected transistor pair. The driving section comprises a first transistor pair.

The scope of the present application is not intended to be limited to the particular embodiments of the process, machine, manufacture, and composition of matter, means, methods and steps described in the specification. As those skilled in the art will readily appreciate from the disclosure of the present disclosure, processes, machines, manufacture, composition of matter, means, methods or steps presently existing or later to be developed, that perform substantially the same function or achieve substantially the same result as the corresponding embodiments described herein may be utilized according to the present disclosure. Accordingly, the appended claims are intended to include within their scope such as processes, machines, manufacture, compositions of matter, means, methods or steps/operations. In addition, each claim constitutes a separate embodiment, and the combination of various claims and embodiments are within the scope of the disclosure.

What is claimed is:

1. A bias voltage generating device, comprising:

a first diode-connected transistor pair connected to receive a first voltage, the first diode-connected transistor pair includes a diode-connected p-type transistor and a diode-connected n-type transistor;

a second diode-connected transistor pair connected to receive a second voltage; and a first transistor pair connected to the first diode-connected transistor pair and the second diode-connected transistor pair, the first transistor pair configured to generate a third voltage in response to the first voltage and the second voltage, wherein a drain and a gate of the diode-connected p-type transistor of the first diode-connected transistor pair and a drain and a gate of the diode-connected n-type transistor of the first diode-connected transistor pair are connected to a gate of a n-type transistor of the first transistor pair.

2. The bias voltage generating device of claim 1, wherein the second diode-connected transistor pair includes a diode-connected p-type transistor and a diode-connected n-type transistor.

3. The bias voltage generating device of claim 2, wherein a drain and a gate of the diode-connected p-type transistor are connected.

4. The bias voltage generating device of claim 2, wherein a drain and a gate of the diode-connected n-type transistor are connected.

5. The bias voltage generating device of claim 2, wherein a drain and a gate of the diode-connected p-type transistor and a drain and a gate of the diode-connected n-type transistor are connected.

6. The bias voltage generating device of claim 2, wherein a drain and a gate of the diode-connected p-type transistor of the second diode-connected transistor pair and a drain and a gate of the diode-connected n-type transistor of the second diode-connected transistor pair are connected to a gate of a p-type transistor of the first transistor pair.

7. The bias voltage generating device of claim 1, wherein:

the first transistor pair is connected to receive the first voltage and the second voltage;

the first diode-connected transistor pair is connected between a first impedance element and the second diode-connected transistor pair, and the second diode-connected transistor pair is connected between the first diode-connected transistor pair and a second impedance element.

8. The bias voltage generating device of claim 7, wherein each of the first and second impedance elements includes a resistor, a long channel p-type MOSFET diode, and a long channel n-type MOSFET diode.

9. The bias voltage generating device of claim 8, wherein:

the long channel p-type MOSFET diode includes a first p-type transistor and a second p-type transistor;

a gate of the first p-type transistor and a drain and a gate of the second p-type transistor are connected; and a drain of the first n-type transistor and a source of the first n-type transistor are connected.

10. The bias voltage generating device of claim 8, wherein:

the long channel n-type MOSFET diode includes a first n-type transistor and a second n-type transistor;

a drain and a gate of the first n-type transistor and a gate of the second n-type transistor are connected; and a source of the first n-type transistor and a drain of the first n-type transistor are connected.

11. The bias voltage generating device of claim 7, wherein each of the first and second impedance elements is formed by a resistor and a long channel MOSFET diode.

12. The bias voltage generating device of claim 1, wherein the first transistor pair includes the n-type transistor and a p-type transistor, and a source of the n-type transistor of the first transistor pair and a source of the p-type transistor of the first transistor pair are connected.

13. The bias voltage generating device of claim 12, wherein the third voltage is generated at the source of the n-type transistor of the first transistor pair and the source of the p-type transistor of the first transistor pair.

14. The bias voltage generating device of claim 1, wherein the third voltage is a portion of a difference between the first voltage and the second voltage.

15. A bias voltage generating device, comprising:

a reference bias section connected to receive a first voltage and a second voltage, the reference bias section comprising a first diode-connected transistor pair connected to receive the first voltage and a second diode-connected transistor pair connected to receive the second voltage, the first diode-connected transistor pair includes a diode-connected p-type transistor and a diode-connected n-type transistor; and a driving section connected to the reference bias section, the driving section configured to generate a third voltage in response to the first voltage and the second voltage, the driving section comprising a first transistor pair, wherein a drain and a gate of the diode-connected p-type transistor of the first diode-connected transistor pair and a drain and a gate of the diode-connected n-type transistor of the first diode-connected transistor pair are connected to a gate of a n-type transistor of the first transistor pair.

16. The bias voltage generating device of claim 15, wherein the second diode-connected transistor pair includes a diode-connected p-type transistor and a diode-connected n-type transistor.

17. The bias voltage generating device of claim 15, wherein:

the first transistor pair is connected to receive the first voltage and the second voltage;

the first diode-connected transistor pair is connected between a first impedance element and the second diode-connected transistor pair, and the second diode-connected transistor pair is connected between the first diode-connected transistor pair and a second impedance element.

18. The bias voltage generating device of claim 15, wherein the first transistor pair includes the n-type transistor and a p-type transistor, and a source of the n-type transistor of the first transistor pair and a source of the p-type transistor of the first transistor pair are connected.

19. A method for manufacturing a bias voltage generating circuit comprising:

forming the bias voltage generating circuit, comprising:

a reference bias section comprising a first diode-connected transistor pair and a second diode-connected transistor pair, the first diode-connected transistor pair includes a diode-connected p-type transistor and a diode-connected n-type transistor; and a driving section connected to the reference bias section, the driving section comprising a first transistor pair, wherein a drain and a gate of the diode-connected p-type transistor of the first diode-connected transistor pair and a drain and a gate of the diode-connected n-type transistor of the first diode-connected transistor pair are connected to a gate of a n-type transistor of the first transistor pair;

supplying a first voltage to the first diode-connected transistor pair;

supplying a second voltage to the second diode-connected transistor pair;

generating a third voltage in response to the first voltage and the second voltage.

20. The method of claim 19, wherein the second diode-connected transistor pair includes a diode-connected p-type transistor and a diode-connected n-type transistor.

* * * * *